(12) United States Patent
Kawauchi et al.

(10) Patent No.: US 12,580,270 B2
(45) Date of Patent: Mar. 17, 2026

(54) ENERGY STORAGE FACILITY

(71) Applicant: GS Yuasa International Ltd., Kyoto (JP)

(72) Inventors: Tomohiro Kawauchi, Shiga (JP); Toshiki Kusunoki, Shiga (JP); Tsuyoshi Hidaka, Shiga (JP); Yasutaka Miyawaki, Kyoto (JP); Masaaki Mima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 640 days.

(21) Appl. No.: 17/770,391

(22) PCT Filed: Oct. 22, 2020

(86) PCT No.: PCT/JP2020/039731
§ 371 (c)(1),
(2) Date: Apr. 20, 2022

(87) PCT Pub. No.: WO2021/079938
PCT Pub. Date: Apr. 29, 2021

(65) Prior Publication Data
US 2022/0376350 A1 Nov. 24, 2022

(30) Foreign Application Priority Data
Oct. 23, 2019 (JP) ................................. 2019-192451

(51) Int. Cl.
H01M 50/296 (2021.01)
H01G 11/10 (2013.01)
(Continued)

(52) U.S. Cl.
CPC .......... H01M 50/296 (2021.01); H01G 11/10 (2013.01); H01M 50/209 (2021.01); H01M 50/514 (2021.01)

(58) Field of Classification Search
CPC ............ H01M 50/296; H01M 50/209; H01M 50/514; H01G 11/10
See application file for complete search history.

(56) References Cited

U.S. PATENT DOCUMENTS 9,709,628 B2 * 7/2017 Whetsel ......... G01R 31/318536
2010/0224403 A1 9/2010 Kosaki et al.
(Continued)

FOREIGN PATENT DOCUMENTS

CN 108767154 A 11/2018
JP 2004006122 A * 1/2004
(Continued)

OTHER PUBLICATIONS

JP-2004006122MT (Year: 2012).*
(Continued)

*Primary Examiner* — Alexander Usyatinsky
(74) *Attorney, Agent, or Firm* — McGinn IP Law Group, PLLC

(57) ABSTRACT

An energy storage facility includes a plurality of energy storage apparatuses. Each of the plurality of energy storage apparatuses includes: an energy storage unit an outer case; a positive electrode power cable; and a negative electrode power cable. Each of the positive electrode power cable and the negative electrode power cable is connected to the energy storage unit inside the outer case, and extends from the outer case. The positive electrode power cable includes a positive electrode connector, and the negative electrode power cable includes a negative electrode connector separated from the positive electrode connector. The positive electrode connector of one energy storage apparatus in two energy storage apparatuses adjacent to each other in the plurality of energy storage apparatuses is directly connected
(Continued)

to the negative electrode connector of the other energy storage apparatus in the two energy storage apparatuses.

12 Claims, 10 Drawing Sheets

(51) Int. Cl.
 *H01M 50/209*      (2021.01)
 *H01M 50/514*      (2021.01)

(56) References Cited

U.S. PATENT DOCUMENTS

| | | | |
|---|---|---|---|
| 2011/0020686 A1 | 1/2011 | Yamamoto et al. | |
| 2012/0058382 A1 | 3/2012 | Carignan et al. | |
| 2012/0263989 A1* | 10/2012 | Byun | H01M 50/271 |
| | | | 361/752 |
| 2014/0370341 A1 | 12/2014 | Oshiba et al. | |
| 2015/0283965 A1* | 10/2015 | Lynds | H01M 10/613 |
| | | | 361/434 |
| 2017/0346139 A1 | 11/2017 | Kobayashi et al. | |
| 2018/0190964 A1 | 7/2018 | Caumont | |
| 2018/0191090 A1 | 7/2018 | Nakazawa | |
| 2019/0103594 A1 | 4/2019 | Furusawa et al. | |

| | | | |
|---|---|---|---|
| 2019/0221816 A1* | 7/2019 | Yanagida | H01M 50/503 |
| 2019/0222003 A1 | 7/2019 | Yanagida et al. | |
| 2019/0237721 A1 | 8/2019 | Reimer et al. | |

FOREIGN PATENT DOCUMENTS

| | | | | |
|---|---|---|---|---|
| JP | 2010-211962 A | 9/2010 | | |
| JP | 2011-155829 A | 8/2011 | | |
| JP | 2013-171728 A | 9/2013 | | |
| JP | 2013-536974 A | 9/2013 | | |
| JP | 2015-088312 A | 5/2015 | | |
| JP | 2016-171028 A | 9/2016 | | |
| JP | 2017-212064 A | 11/2017 | | |
| JP | 2018-110074 A | 7/2018 | | |
| JP | 2018-181689 A | 11/2018 | | |
| JP | 2019-125476 A | 7/2019 | | |
| JP | 2019-213377 A | 12/2019 | | |
| KR | 20170050508 A | 5/2017 | | |
| WO | WO-2017025452 A1 * | 2/2017 | | H01M 50/209 |

OTHER PUBLICATIONS

The decision of JPO to grant a Patent for Application JP2021553528 MT (Year: 2025).*
International Search Report (ISR) (PCT Form PCT/ISA/210), in PCT/JP2020/039731, dated Dec. 22, 2020.

* cited by examiner

ENERGY STORAGE FACILITY

TECHNICAL FIELD

The present invention relates to an energy storage facility including a plurality of energy storage apparatuses.

BACKGROUND ART

Patent Document 1 discloses a structure of a connecting body of an assembled battery unit configured by connecting a plurality of assembled battery units. Each of the plurality of assembled battery units includes an assembled battery body configured by a plurality of battery cells and a box in which the assembled battery body is accommodated. A plurality of positive electrode connectors connected in parallel to a positive electrode of the assembled battery body are disposed at four corners of the box. At the same time, a plurality of negative electrode connectors connected in parallel to a negative electrode of the assembled battery body are disposed adjacent to the positive electrode connectors. In Patent Document 1, the assembled battery units (energy storage apparatuses) are arrayed in at least one of a row direction and a column direction, and the assembled battery units adjacent to each other are electrically connected by a cable to form the connecting body of the assembled battery unit.

PRIOR ART DOCUMENT

Patent Document

Patent Document 1: JP-A-2004-6122

SUMMARY OF THE INVENTION

Problems to be Solved by the Invention

Conventionally, as in the connection body of the conventional assembled battery unit, when a connection cable (power cable) forming a conduction path of current during charge-discharge is used for electric connection between two energy storage apparatuses adjacent to each other, connection work is required at both ends of the connection cable. Specifically, one end of the connection cable is connected to an electrode terminal of one energy storage apparatus, and the other end of the connection cable is connected to an electrode terminal of the other energy storage apparatus. That is, in an energy storage facility including a plurality of energy storage apparatuses, in order to electrically connect two energy storage apparatuses adjacent to each other, the connection cable between electrode terminals of a set of two energy storage apparatuses adjacent to each other is required to be prepared and both ends of the connection cable to each energy storage apparatus is required to be connected. This leads to complication of installation work of the energy storage facility. In particular, this problem becomes more conspicuous when the number of energy storage apparatuses included in the energy storage facility increases.

An object of the present invention is to provide an energy storage facility including the plurality of energy storage apparatuses, and the energy storage facility in which connection work of the plurality of energy storage apparatuses can be easily performed.

Means for Solving the Problems

An energy storage facility according to one aspect of the present invention is an energy storage facility including a plurality of energy storage apparatuses. Each of the plurality of energy storage apparatuses includes: an energy storage unit including a plurality of energy storage devices and an outer case holding the plurality of energy storage devices; a first power cable that is connected to one of a positive electrode connection terminal and a negative electrode connection terminal of the energy storage unit inside the outer case and extends from an end of the outer case toward an outside of the outer case; and a second power cable that is connected to the other of the positive electrode connection terminal and the negative electrode connection terminal of the energy storage unit inside the outer case and extends from the end of the outer case toward the outside of the outer case, the first power cable includes a first connector, the second power cable includes a second connector, and the first connector of a first energy storage apparatus that is one of two energy storage apparatuses adjacent to each other in the plurality of energy storage apparatuses is directly connected to the second connector of a second energy storage apparatus that is the other of the two energy storage apparatuses.

Advantages of the Invention

According to the energy storage facility of the present invention, the connection work of the plurality of energy storage apparatuses can be easily performed.

MODE FOR CARRYING OUT THE INVENTION

Figure 1:
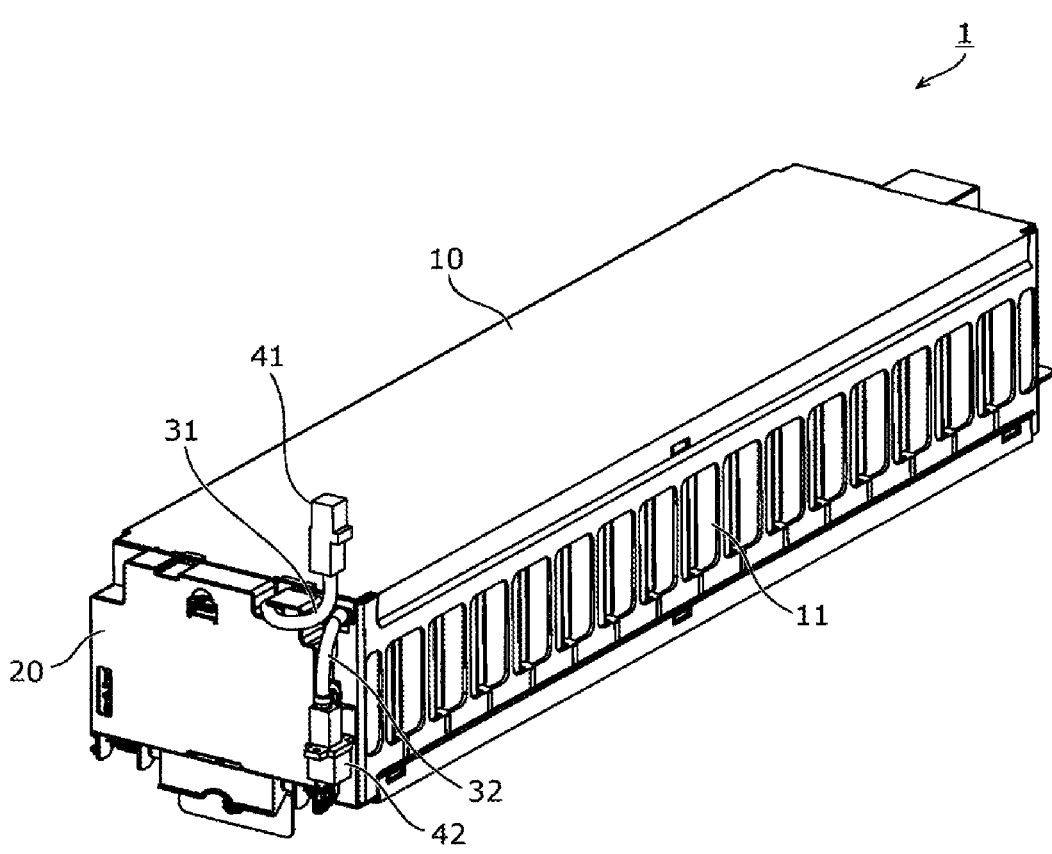
FIG. 1 is a perspective view illustrating an appearance of an energy storage apparatus according to an embodiment.
Figure 1:
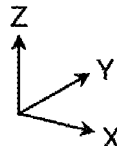

Conventionally, when a connection cable (power cable) forming a conduction path of current during charge-discharge is used for electric connection between two energy storage apparatuses adjacent to each other, connection work is required at both ends of the connection cable. Specifically, one end of the connection cable is connected to an electrode terminal of one energy storage apparatus, and the other end of the connection cable is connected to an electrode terminal of the other energy storage apparatus. That is, in an energy storage facility including a plurality of energy storage apparatuses, in order to electrically connect two energy storage apparatuses adjacent to each other, the connection cable between electrode terminals of a set of two energy storage apparatuses adjacent to each other is required to be prepared and both ends of the connection cable to each energy storage apparatus is required to be connected. This leads to complication of installation work of the energy storage facility. In particular, this problem becomes more conspicuous when the number of energy storage apparatuses included in the energy storage facility increases.

The present invention has been made by the inventor of the present application to newly focus on the above problems, and an object of the present invention is to provide an energy storage facility including the plurality of energy storage apparatuses, and the energy storage facility in which connection work of the plurality of energy storage apparatuses can be easily performed.

An energy storage facility according to one aspect of the present invention is an energy storage facility including a plurality of energy storage apparatuses. Each of the plurality of energy storage apparatuses includes: an energy storage unit including a plurality of energy storage devices and an outer case holding the plurality of energy storage devices; a first power cable that is connected to one of a positive electrode connection terminal and a negative electrode connection terminal of the energy storage unit inside the outer case and extends from an end of the outer case toward an outside of the outer case; and a second power cable that is connected to the other of the positive electrode connection terminal and the negative electrode connection terminal of the energy storage unit inside the outer case and extends from the end of the outer case toward the outside of the outer case, the first power cable includes a first connector, the second power cable includes a second connector, and the first connector of a first energy storage apparatus that is one of two energy storage apparatuses adjacent to each other in the plurality of energy storage apparatuses is directly connected to the second connector of a second energy storage apparatus that is the other of the two energy storage apparatuses.

According to this configuration, in the plurality of arranged energy storage apparatuses, one first connector and the other second connector of two adjacent energy storage apparatuses are connected to each other, whereby the two energy storage apparatuses are connected to each other. That is, the two energy storage apparatuses are electrically connected by one (one place) connection work. Because the first connector and the second connector are separated from each other, the first connector and the second connector can be directed in different directions from each other, so that the energy storage apparatus can be connected in series to the energy storage apparatuses on both sides (up and down, left and right, or the like) in the arrangement direction of the energy storage apparatuses. As described above, because each energy storage apparatus has the power cables with the connectors for the positive electrode and the negative electrode, the two energy storage apparatuses to be connected can be easily connected to each other without separately using a conductive member such as a cable for connecting the energy storage apparatuses to each other and without using a tool such as a wrench. As described above, according to the energy storage facility of the aspect, the connection work of the plurality of energy storage apparatuses can be easily performed.

The plurality of energy storage apparatuses may be arranged in a second direction intersecting a first direction in a posture where the end of the outer case of each of the plurality of energy storage apparatuses face the first direction, and the first connector of the first energy storage apparatus may be configured to be unconnectable to the second connector of an energy storage apparatus other than the second energy storage apparatus.

According to this configuration, the first connector provided in the first power cable of one energy storage apparatus cannot be physically connected to the second connector that is prohibited from being connected. Consequently, when a large number of energy storage apparatuses that are the same product are arranged vertically and horizontally, the first connector and the second connector are not connected to each other by an incorrect combination. That is, the connection work of the plurality of energy storage apparatuses can be easily and accurately performed.

The outer case may be a prismatic type, and the first power cable and the second power cable may extend to the outside of the outer case from a corner of the outer case that is a part of the end of the outer case.

According to this configuration, because the outlets from the outer case of the two power cables are concentrated at the corner of the outer case, even when the energy storage apparatus of the connection partner is any of the upper, lower, left, and right, the power cables are arranged in the posture along the vertical direction or the horizontal direction. That is, when the adjacent energy storage apparatuses are connected in series, the power cables are not disposed obliquely with respect to the vertical direction or the horizontal direction. Consequently, the length of the power cable may be relatively short, and the connection work between the power cables (the connection work between the first connector and the second connector) is easy to perform.

In each of the plurality of energy storage apparatuses, the first power cable and the second power cable may be disposed at positions where one of the first connector and the second connector can be oriented toward an opposite side of the other of the first connector and the second connector on the same straight line.

According to this configuration, because the first connector and the second connector of one energy storage apparatus are arranged in opposite directions (one is directed away from the other, and the same applies to the following) and on a straight line, when the plurality of energy storage apparatuses are arranged in a direction parallel to the straight line, one first connector and the other second connector of two adjacent energy storage apparatuses are in a posture facing each other coaxially. Accordingly, the plurality of energy storage apparatuses can be easily connected in series.

The energy storage facility further includes a rack including at least one shelf board on which each of the plurality of energy storage apparatuses is mounted. In each of the plurality of energy storage apparatuses, the end of the outer case may be disposed so as to face a front of the rack, and the first connector and the second connector may be disposed such that positions in a front-rear direction of the first connector and the second connector are located at or near a front end face of the shelf board.

According to this configuration, the first connector and the second connector of the combination to be connected are disposed at or near the front end of the rack. Consequently, the connection work of one first connector and the other second connector of the two energy storage apparatuses vertically adjacent to each other is easily performed after the plurality of energy storage apparatuses are mounted on at least one of shelf board of the rack. When the positions in the front-rear direction of the first connector and the second connector to be connected are located at the same position as or in front of the front end face of the shelf board located between the two energy storage apparatuses, the connection work of the first connector and the second connector can be performed without being obstructed by the shelf board.

At least a part of a portion of the first power cable extending from the energy storage unit may be fixed to the energy storage unit, and a portion of the second power cable extending from the energy storage unit may not be fixed to the energy storage unit.

According to this configuration, the first power cable drawn out from one energy storage apparatus is fixed to the one energy storage apparatus and the second power cable drawn out from the one energy storage apparatus is not fixed and is free. Thus, when the first connector of the energy storage apparatus and the second connector of another energy storage apparatus are connected to each other, the position of the first connector is stabilized, and a freedom degree of the position and posture of the second connector is high, so that the connection work between the first connector and the second connector is easy to perform.

Hereinafter, an energy storage apparatus and an energy storage facility according to an embodiment (including a modification of the present invention) will be described with reference to the drawings. The embodiment described below illustrates a comprehensive or specific example. Numerical values, shapes, materials, components, dispositions of the components, connection forms of the components, and the like described in the following embodiment are merely examples, and are not intended to limit the present invention. In each of the drawings, dimensions and the like are not strictly illustrated.

In the following description and drawings, an arrangement direction of a pair (a positive electrode side and a negative electrode side) of electrode terminals in one energy storage device, a facing direction of a short side surface of a case of the energy storage device, or a facing direction of a long side surface of an outer case of the later-described energy storage unit is defined as an X-axis direction. The arrangement direction of the plurality of energy storage devices, the facing direction of the long side surface of the case of the energy storage devices, the facing direction of the short side surface of the outer case of the energy storage unit, or the arrangement direction of the energy storage unit and the substrate unit is defined as a Y-axis direction. The arrangement direction of a base member and an outer case lid of the energy storage unit, the arrangement direction of the energy storage device and a bus bar, the arrangement direction of a case body and a lid of the energy storage device, or a vertical direction is defined as a Z-axis direction. The X-axis direction, the Y-axis direction, and the Z-axis direction are directions intersecting with one another (orthogonal to one another in the embodiment). Although it may be conceivable that the Z-axis direction is not in the vertical direction depending on a mode of use, hereinafter the Z-axis direction is described as the vertical direction for convenience of explanation. In the following description, the Y-axis direction is also referred to as a first direction. A direction intersecting the Y-axis direction (first direction) is also referred to as a second direction. The second direction may be the Z-axis direction or the X-axis direction.

In the following description, an X-axis positive direction indicates an arrow direction side of the X-axis, and an X-axis negative direction indicates an opposite direction to the X-axis positive direction. The same applies to the Y-axis direction and the Z-axis direction. An expression indicating a relative direction or a posture such as parallel and orthogonal strictly also includes the case where the expression is not the direction or the posture. For example, two directions orthogonal to each other means not only that the two directions are completely orthogonal to each other, but also that the two directions are substantially orthogonal to each other, namely, includes a difference of, for example, about several percent.

Embodiment

[1. General Description of Energy Storage Apparatus]

Figure 2:
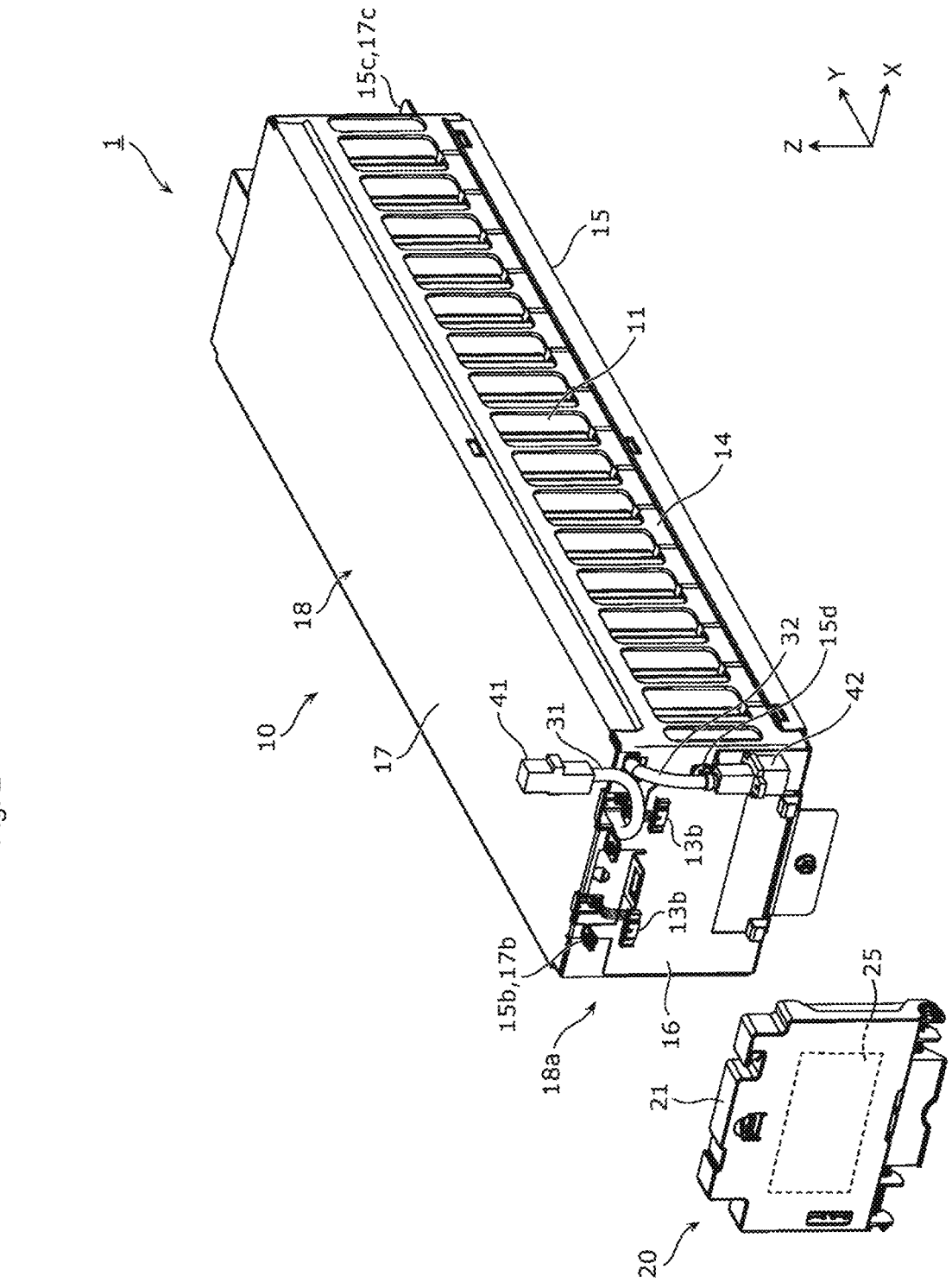
FIG. 2 is a perspective view illustrating a configuration when the energy storage apparatus of the embodiment is separated into an energy storage unit and a substrate unit.
Figure 3:
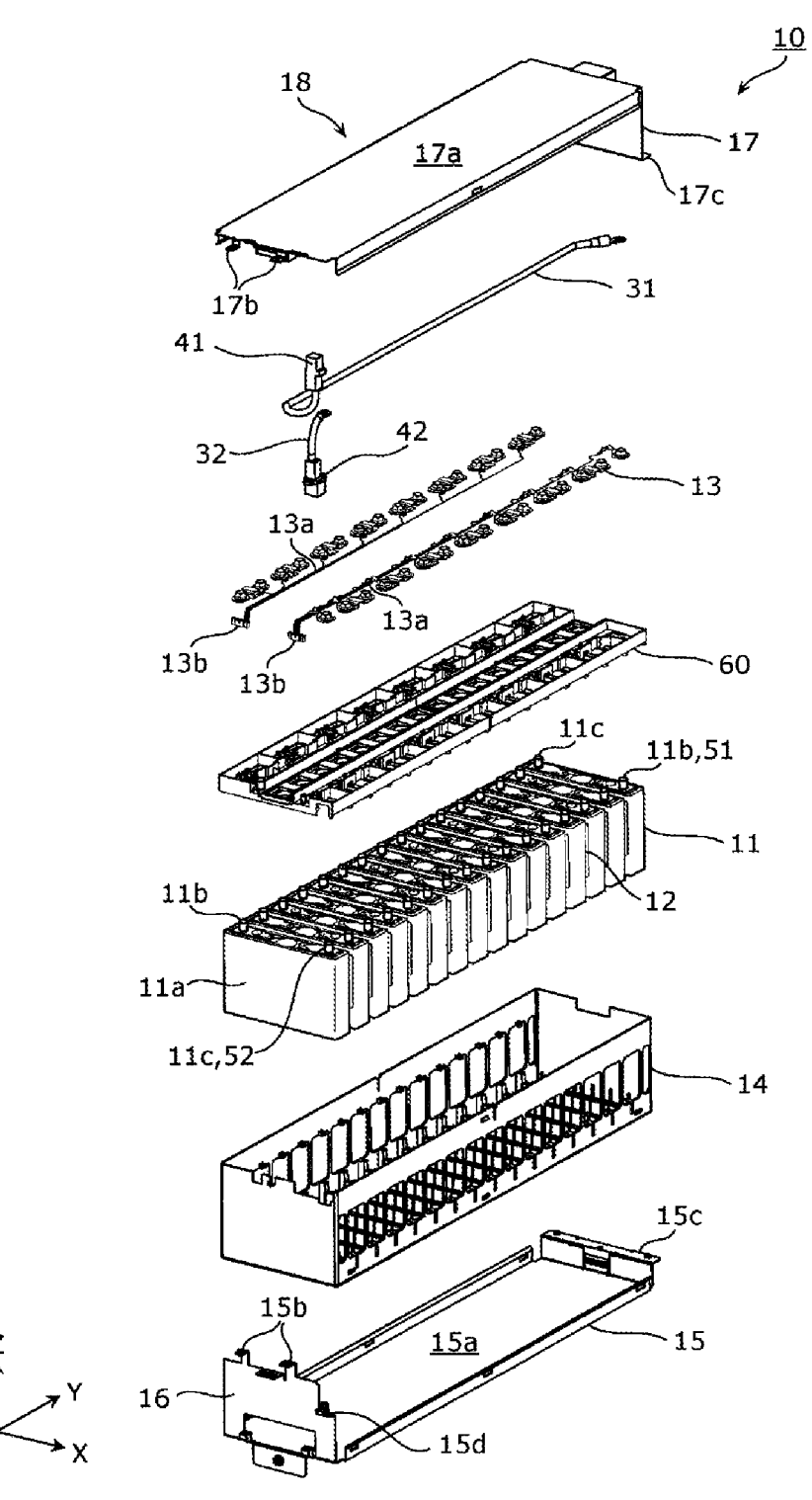
FIG. 3 is an exploded perspective view illustrating each component when the energy storage unit of the embodiment is disassembled.

A configuration of an energy storage apparatus 1 of the embodiment will be described. FIG. 1 is a perspective view illustrating an appearance of the energy storage apparatus 1 of the embodiment. FIG. 2 is a perspective view illustrating a configuration when the energy storage apparatus 1 of the embodiment is separated into an energy storage unit 10 and a substrate unit 20. FIG. 3 is an exploded perspective view illustrating each component when the later-described energy storage unit 10 of the embodiment is disassembled.

The energy storage apparatus 1 is an apparatus capable of charging electricity from the outside and discharging electricity to the outside, and has a substantially rectangular parallelepiped shape in the embodiment. The energy storage apparatus 1 of the embodiment is used as a stationary battery provided in an energy storage facility 100 that accumulates and outputs power generated by a generator. The energy storage facility 100 includes a plurality of energy storage apparatuses 1 electrically connected to each other. The configuration of the energy storage facility 100 will be described later with reference to FIGS. 6 and 7.

The energy storage apparatus 1 can be used not only as the stationary battery used for home use, a generator, or the like, but also as various power storage applications, power supply applications, or the like. For example, the energy storage apparatus 1 may be used as a battery driving a moving body such as automobiles, motorcycles, watercrafts, vessels, snowmobiles, agricultural machines, construction machines, and railroad vehicles for electric railroad or a battery starting an engine. Examples of the automobiles include an electric vehicle (EV), a hybrid electric vehicle (HEV), a plug-in hybrid electric vehicle (PHEV), and a gasoline automobile. Examples of the railway vehicles for electric railway include a train, a monorail, and a linear motor car.

As illustrated in FIGS. 1 to 3, the energy storage apparatus 1 includes the energy storage unit 10 and the substrate unit 20 attached to the energy storage unit 10. The energy storage unit 10 is a battery module (assembled battery) having a substantially rectangular parallelepiped shape elongated in the Y-axis direction. Specifically, the energy storage unit 10 includes a plurality of energy storage devices 11, a bus bar frame 60, a plurality of bus bars 13, an outer case body 14 that accommodates the plurality of energy storage devices 11, the bus bar frame 60, and the plurality of bus bars 13, and an outer case 18 including a base member 15 and an outer case lid 17. A positive electrode power cable 31 and a negative electrode power cable 32 are connected to the energy storage unit 10. The energy storage unit 10 may include a binding member (end plate, side plate, and the like) that binds the plurality of energy storage devices 11.

The energy storage device 11 is a secondary battery (battery cell) that can charge and discharge the electricity, more specifically is a nonaqueous electrolyte secondary battery such as a lithium ion secondary battery. The energy storage device 11 has a flat, rectangular parallelepiped (prismatic) shape. In the embodiment, sixteen energy storage devices 11 are arrayed in the Y-axis direction. A shape, an arrangement position, a number, and the like of the energy storage device 11 are not particularly limited. The energy storage device 11 is not limited to the nonaqueous electrolyte secondary battery, but may be a secondary battery except for the nonaqueous electrolyte secondary battery or a capacitor. The energy storage device 11 is not the secondary battery, but may be a primary battery that can use stored electricity without being charged by a user. The energy storage device 11 may be a battery in which a solid electrolyte is used. The energy storage device 11 may be a pouch-type energy storage device.

Specifically, the energy storage device 11 includes a metal case 11a, and a positive electrode terminal 11b and a negative electrode terminal 11c that are metal electrode terminals are provided in a lid of the case 11a. A spacer 12 is disposed between the adjacent energy storage devices 11. An electrolyte solution filling unit that injects an electrolyte solution, a gas release valve that discharges gas to release pressure during pressure rise in the case 11a, and the like may be provided in the lid of the case 11a. An electrode assembly (also referred to as an energy storage element or a power generating element), a current collector (a positive electrode current collector and a negative electrode current collector), and the like are disposed in the case 11a, and the electrolyte solution (nonaqueous electrolyte) or the like is enclosed in the case 11a. However, the detailed description is omitted.

The positive electrode terminal 11b and the negative electrode terminal 11c are disposed so as to protrude upward (Z-axis positive direction) at both ends in the longitudinal direction (X-axis direction) of the lid of the case 11a. The energy storage devices 11 are electrically connected to each other, and the outermost positive electrode terminal 11b and negative electrode terminal 11c that are included in the plurality of energy storage devices 11 are connected to the power cable, which allows the energy storage apparatus 1 (energy storage unit 10) to charge and discharge the electricity from and to an outside.

Specifically, as illustrated in FIG. 3, the positive electrode terminal 11b of the energy storage device 11 disposed at the end in the Y-axis positive direction of the plurality of energy storage devices 11 functions as a total positive terminal (a positive electrode connection terminal 51 of the energy storage unit 10) of the plurality of energy storage devices 11. That is, in the inside of the outer case 18, the positive electrode power cable 31 is connected to the positive electrode connection terminal 51 of the energy storage unit 10. In the plurality of energy storage devices 11, the negative electrode terminal 11c of the energy storage device 11 at the end in the Y-axis negative direction functions as a total negative terminal (a negative electrode connection terminal 52 of the energy storage unit 10) of the plurality of energy storage devices 11. That is, in the inside of the outer case 18, the negative electrode power cable 32 is connected to the negative electrode connection terminal 52 of the energy storage unit 10. The positive electrode terminal 11b or the negative electrode terminal 11c of the energy storage device 11 located at the end in the electric connection of the plurality of energy storage devices 11 is handled as the positive electrode connection terminal 51 or the negative electrode connection terminal 52. Consequently, the positive electrode terminal 11b or the negative electrode terminal 11c of the energy storage device 11 in the middle of the row in the plurality of energy storage devices 11 arranged in a row may be handled as the positive electrode connection terminal 51 or the negative electrode connection terminal 52.

The positive electrode connection terminal 51 (negative electrode connection terminal 52) and the positive electrode power cable 31 (negative electrode power cable 32) are not necessarily directly connected to each other. An output terminal bus bar may be connected to the positive electrode terminal 11b that is the positive electrode connection terminal 51, and the positive electrode power cable 31 may be connected to the output terminal bus bar. Each of the positive electrode power cable 31 and the negative electrode power cable 32 does not need to be formed of a single cable. A first cable connected to the positive electrode terminal 11b that is the positive electrode connection terminal 51 may be connected to a relay member (bus bar or the like) on the electric circuit, and the other end of a second cable in which a positive electrode connector 41 is provided at one end may be connected to the relay member. That is, a conductive member such as the bus bar may be interposed on a conduction path of the positive electrode power cable 31.

As described above, in the embodiment, the positive electrode terminal 11b and the negative electrode terminal 11c of the energy storage device 11 are arranged in the direction (X-axis direction) intersecting the array direction (Y-axis direction) of the plurality of energy storage devices 11 on one side surface of the case 11a. The number of the energy storage devices 11 is an even number (16 in the embodiment), and the even number of the energy storage devices 11 are connected in series.

Figure 9:
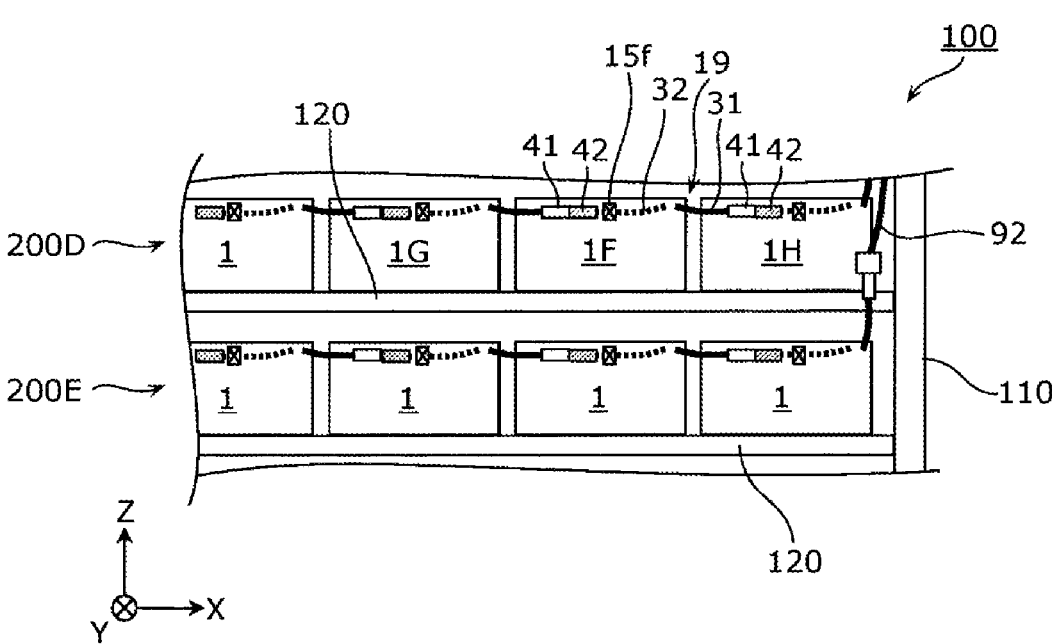
FIG. 9 is a partial plan view illustrating a configuration outline of an energy storage facility according to a first modification of the embodiment.

According to this configuration, because the number of the energy storage devices 11 is the even number, the positive electrode connection terminal 51 and the negative electrode connection terminal 52 of the energy storage unit 10 are disposed on the same side in the X-axis direction (in this embodiment, on the X-axis plus direction side). Consequently, the positive electrode connector 41 and a negative electrode connector 42 are easily disposed in the same straight line. In each energy storage apparatus 1, because the opposite side in the X-axis direction (in this embodiment, the X-axis negative direction side) is vacant, one negative electrode connector 42 of two energy storage apparatuses 1 adjacent to each other in the horizontal direction (X-axis direction) is easily connected to the other positive electrode connector 41 as illustrated in FIG. 9. That is, the empty space exists near an end 18a of the energy storage apparatus 1, so that a cable routing length for connecting connectors to each other can be secured for each of the positive electrode power cable 31 and the negative electrode power cable 32.

The positive electrode power cable 31 and the negative electrode power cable 32 are covered wires (also referred to as power cables, main circuit cables, power supply lines, and power lines) through which current (also referred to as a charge-discharge current and a main current) charging and discharging the energy storage apparatus 1 (energy storage unit 10) flows. Each of the positive electrode power cable 31 and the negative electrode power cable 32 is a relatively thick electric wire in which a sectional area of a core wire is about 5 mm$^2$ to about 20 mm$^2$. In the embodiment, the covered cable having the core wire with the sectional area of about 8 mm$^2$ is adopted as each of the positive electrode power cable 31 and the negative electrode power cable 32. A positive electrode connector 41 is provided at an end of a portion of the positive electrode power cable 31 exposed from the energy storage unit 10, and a negative electrode connector 42 is provided at an end of a portion of the negative electrode power cable 32 exposed from the energy storage unit 10. In the embodiment, one of the positive electrode power cable 31 and the negative electrode power cable 32 is an example of the first power cable, and the other is an example of the second power cable. The positive electrode connector 41 or the negative electrode connector 42 provided at the end of positive electrode power cable 31 or the negative electrode power cable 32 that is the first power cable is an example of the first connector. The positive electrode connector 41 or the negative electrode connector 42 provided at the end of the positive electrode power cable 31 or the negative electrode power cable 32 that is the second power cable is an example of the second connector. The disposition positions and the like of these power cables and connectors will be described later with reference to FIGS. 4 and 5.

The bus bar frame 60 is a flat rectangular member capable of electrically insulating the bus bars 13 from other members and regulating the position of the bus bar 13. The bus bar frame 60 is formed of an insulating member or the like, such as polycarbonate (PC), polypropylene (PP), or polyethylene (PE), which is a material similar to the substrate case 21 of the substrate unit 20 described later. Specifically, the bus bar frame 60 is placed above the plurality of energy storage devices 11, and is positioned with respect to the plurality of energy storage devices 11. The bus bar 13 is placed and positioned on the bus bar frame 60. Thus, the bus bar 13 is positioned with respect to the plurality of energy storage devices 11, and is joined to the positive electrode terminals 11b and the negative electrode terminals 11c that are included in the plurality of energy storage devices 11. The bus bar frame 60 also has a function of reinforcing the outer case body 14 as an inner lid of the outer case 18.

The bus bar 13 is a rectangular plate-shaped member that is disposed on the plurality of energy storage devices 11 (on the bus bar frame 60) and electrically connects the electrode terminals of the plurality of energy storage devices 11 to each other. The bus bar 13 is made of metal such as aluminum, and an aluminum alloy, copper, a copper alloy, and stainless steel. In the embodiment, the bus bar 13 connects the positive electrode terminal 11b and the negative electrode terminal 11c of the adjacent energy storage devices 11, thereby connecting the sixteen energy storage devices 11 in series. The connection state of the energy storage device 11 is not limited to the above connection, but series connection and parallel connection may be combined in any way.

A detection cable 13a is connected to the bus bar 13 or the electrode terminal of the energy storage device 11. The detection cable 13a is an electric wire (also referred to as a communication cable, a control cable, a communication line, and a control line) for measuring a voltage of the energy storage device 11, for measuring a temperature of the energy storage device 11, or for voltage balancing between the energy storage devices 11. Although a thermistor (not illustrated) measuring the temperature of the energy storage device 11 is disposed on the bus bar 13 or the electrode terminal of the energy storage device 11, the description thereof is omitted. A connector 13b is connected to the end in the Y-axis negative direction of the detection cable 13a. The connector 13b is a connector connected to a substrate 25 of the substrate unit 20 described later. That is, the detection cable 13a transmits information such as voltage and temperature of the energy storage device 11 to the substrate 25 of the substrate unit 20 through the connector 13b. The detection cable 13a is also used when the energy storage device 11 having the high voltage is discharged to balance the voltages between the energy storage devices 11 by controlling the substrate 25.

The outer case 18 is a rectangular (box-shaped) case (module case) constituting an outer case of the energy storage unit 10. That is, the outer case 18 is disposed outward the energy storage device 11 and the like, and fixes the energy storage device 11 and the like at predetermined positions to protect the energy storage device 11 and the like from an impact and the like. As described above, the outer case 18 includes the outer case body 14, the base member 15, and the outer case lid 17.

The outer case body 14 is a bottomed rectangular cylindrical housing in which an opening is formed. The outer case body 14 is formed of an insulating member such as PC, PP, and PE. The base member 15 and the outer case lid 17 are members that protect (reinforce) the outer case body 14. The base member 15 and the outer case lid 17 are made of a metal member such as stainless steel, aluminum, an aluminum alloy, iron, or a plated steel plate. The base member 15 and the outer case lid 17 may be made of a member made of the same material, or made of members made of different materials.

The base member 15 is a plate-like member that supports the outer case body 14 from a lower side (Z-axis negative direction), and also has a role of supporting the plurality of energy storage devices 11 through the outer case body 14. The base member 15 includes a bottom 15a, a substrate unit attaching unit 16, and connection units 15b and 15c. The bottom 15a is a flat plate-like and rectangular member that forms a bottom of the energy storage apparatus 1 and extends in parallel to an XY-plane and in the Y-axis direction, and is disposed below the outer case body 14. The substrate unit attaching unit 16 is a flat plate-shaped and rectangular member erected in the Z-axis positive direction from the end in the Y-axis negative direction-side of the bottom 15a, and the substrate unit 20 is attached to the substrate unit attaching unit 16. The connection unit 15b is a member that is disposed at the end in the Z-axis positive direction-side of the substrate unit attaching unit 16 and projects in the Y-axis negative direction, and is connected to the outer case lid 17. The connection unit 15c is a member that is erected in the Z-axis positive direction from the end in the Y-axis positive direction-side of the bottom 15a and projects in the Y-axis positive direction, and is connected to the outer case lid 17.

The outer case lid 17 is a member that is disposed so as to close the opening of the outer case body 14, and includes a top surface 17a and connection units 17b and 17c. The top surface 17a is a flat plate-like and rectangular member that forms an upper surface of the energy storage apparatus 1 and extends in parallel to the XY-plane and in the Y-axis direction, and is disposed above the outer case body 14. The connection unit 17b is a member that is disposed at the end in the Y-axis negative direction-side of the top surface 17a to protrude in the Y-axis negative direction, and is connected to the connection unit 15b of the base member 15. The connection unit 17c is a member that extends in the Z-axis negative direction from the end in the Y-axis positive direction-side of the top surface 17a and projects in the Y-axis positive direction, and is connected to the connection unit 15c of the base member 15. Thus, the base member 15 and the outer case lid 17 are fixed by connecting the connection units 15b and 15c and the connection units 17b and 17c by screwing or the like while the outer case body 14 is sandwiched from the vertical direction.

The substrate unit 20 is a device capable of monitoring the state of the energy storage device 11 included in the energy storage unit 10 and controlling the energy storage device 11. In the embodiment, the substrate unit 20 is a flat rectangular member attached to the end 18*a* (see FIG. 2) in the longitudinal direction of the outer case 18 of the energy storage unit 10, namely, the side surface in the Y-axis negative direction-side of the energy storage unit 10. The substrate unit 20 includes a substrate case 21 (see FIG. 2) that is formed of an insulating member such as polycarbonate (PC), polypropylene (PP), or polyethylene (PE) and a substrate 25 that is accommodated in the substrate case 21. Specifically, the substrate unit 20 is attached to a substrate unit attaching unit 16 that is provided on the base member 15 included in the outer case 18 of the energy storage unit 10. The substrate 25 is a circuit substrate (monitoring substrate) electrically connected to the energy storage unit 10. Specifically, the substrate 25 is electrically connected to the energy storage device 11 through the detection cable 13*a* and the connector 13*b* to acquire information such as the voltage and the temperature of the energy storage device 11 and monitor states such as a charge state and a discharge state of the energy storage device 11. The substrate 25 also has a function as a control substrate that discharges the energy storage devices 11 using the detection cables 13*a* to balance voltages between the energy storage devices 11. A plurality of components (not illustrated) implementing this function is mounted on the substrate 25. The substrate 25 may not control the energy storage device 11 but only monitor the state of the energy storage device 11, and the control based on the monitoring result may be performed by an external control device connected to the energy storage apparatus 1.

[2. Disposition of Power Cable and Connector]

Subsequently, disposition positions and the like of the positive electrode power cable 31, the negative electrode power cable 32, the positive electrode connector 41, and the negative electrode connector 42 in the energy storage apparatus 1 of the embodiment will be described with reference to FIGS. 4 and 5.

Figure 4:
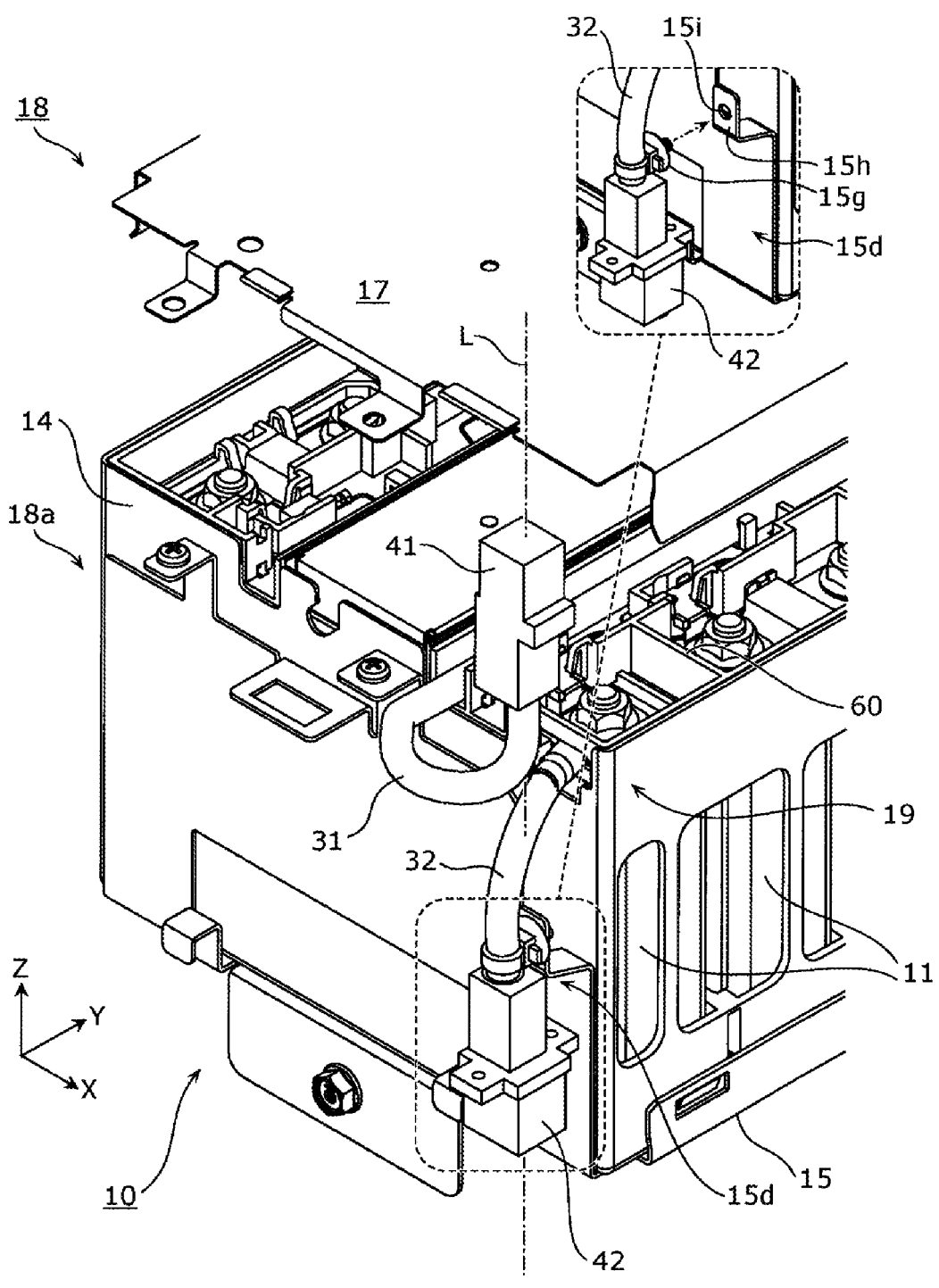
FIG. 4 is a perspective view illustrating a configuration of an end of an outer case in the energy storage unit of the embodiment.

FIG. 4 is a perspective view illustrating a configuration of the end 18*a* of the outer case 18 in the energy storage unit 10 of the embodiment. Specifically, in FIG. 4, the end 18*a* of the outer case 18 is illustrated while the outer case lid 17 is lifted from the outer case body 14. The end 18*a* in the Y-axis negative direction of the outer case 18 is also the end as the energy storage unit 10. For this reason, "the end 18*a* of the outer case 18" can be reworded as "the end 18*a* of the energy storage unit 10". The same applies to an expression such as "extended from the outer case 18", and the "outer case 18" can be replaced with the "energy storage unit 10". FIG. 5 is a view illustrating an example of a range of a corner 19 in the outer case 18 of the embodiment.

As illustrated in FIG. 4, the positive electrode power cable 31 and the negative electrode power cable 32 are disposed while extending from the inside to the outside of the outer case 18. Specifically, both the positive electrode power cable 31 and the negative electrode power cable 32 extend from the end 18*a* of the outer case 18 toward the outside of the outer case 18. The positive electrode power cable 31 includes the positive electrode connector 41, and the negative electrode power cable 32 includes the negative electrode connector 42. Although not illustrated in FIG. 4, a terminal or the like for is disposed in each of the positive electrode connector 41 and the negative electrode connector 42 in order to be electrically connected to a mating connector.

In the embodiment, the positive electrode connector 41 and the negative electrode connector 42 have a structure that can be directly connected to each other. One of the negative electrode connector 42 and the positive electrode connector 41 is mechanically connected (insertion, fitting, screwing, or the like) to the other, whereby the negative electrode connector 42 and the positive electrode connector 41 are electrically connected to each other. Thus, one positive electrode connector 41 and the other negative electrode connector 42 of two adjacent energy storage apparatuses 1 can be easily connected to each other without using a tool such as a spanner. The adjacent energy storage apparatuses 1 can be electrically connected to each other without separately preparing a connection cable or the like.

The adjacent energy storage apparatuses 1 have the same structure, and the positive electrode connector 41 of one energy storage apparatus 1 of the two adjacent energy storage apparatuses 1 is connected to the negative electrode connector 42 of the other energy storage apparatus 1. As for one energy storage apparatus 1, the positive electrode connector 41 and the negative electrode connector 42 can be connected to each other as a single member. However, the positive electrode connector 41 and the negative electrode connector 42 included in one energy storage apparatus 1 are disposed while direct connection with each other is impossible. Specifically, in one energy storage apparatus 1, the positive electrode connector 41 and the negative electrode connector 42 are disposed with a cable length or a posture in which the positive electrode connector 41 and the negative electrode connector 42 cannot be connected to each other. For the example of FIG. 4, in the negative electrode power cable 32, at least a part of a portion extending from the outer case 18 is fixed to the energy storage unit 10. Specifically, in the embodiment, the metal base member 15 includes a fixing unit 15*d* fixing the at least a part of the negative electrode power cable 32, whereby the negative electrode connector 42 is fixed substantially downward (a posture in which an opening of the negative electrode connector 42 into which the positive electrode connector 41 is inserted faces downward and an insertion and removal direction of the positive electrode connector 41 with respect to the negative electrode connector 42 is in a vertical direction, and the same applies hereinafter).

In the embodiment, a part of the negative electrode power cable 32 including the negative electrode connector 42 is fixed to the fixing unit 15*d* formed on the base member 15 by a fixing member 15*g*. Specifically, the fixing member 15*g* is a push mount tie. In the embodiment, the fixing unit 15*d* is implemented by a through-hole (fixing hole 15*i*) made in the base member 15. As illustrated in FIG. 4, the fixing member 15*g* that is the push mount tie is inserted into the fixing hole 15*i* made in a fixing piece 15*h* of the base member 15 in an uninsertable manner, whereby the negative electrode power cable 32 is strongly fixed. For this reason, destruction such as cutting or deformation of the fixing member 15*g* is required to be performed in order to unfix the negative electrode power cable 32. The fixing structure in the fixing unit 15*d* is not particularly limited, but the part may be fixed such that a part of the negative electrode power cable 32 may be embedded in a recess (a groove, a notch, a slit, a hole, and the like) provided in the outer case 18, a recess of a member fixed to the outer case 18, or the like. That is, the fixing unit 15*d* may be implemented by the recess instead of the hole.

As described above, in the state where the posture of the negative electrode connector 42 is regulated, when the length of the portion of the positive electrode power cable 31 extending from the corner 19 of the outer case 18 is as long as illustrated in FIG. 4, the negative electrode connector 42 and the positive electrode connector 41 cannot be directly connected to each other. As described above, the positive electrode connector 41 and the negative electrode connector 42 included in one energy storage apparatus 1 are placed in the state where the positive electrode connector 41 and the negative electrode connector 42 cannot be connected to each other. That is, with no attendance on the destruction, there is no problem of erroneously connecting the positive electrode connector 41 and the negative electrode connector 42 included in one energy storage apparatus 1. In other words, the erroneous connection between the positive electrode connector 41 and the negative electrode connector 42 that may cause a short circuit of the energy storage apparatus 1 itself can be substantially prevented.

The portion of the positive electrode power cable 31 extending from the outer case 18 is not restrained, so that the positive electrode connector 41 can be oriented in any of the upper, lower, left, and right directions. In the embodiment, the negative electrode connector 42 is fixed substantially downward as illustrated in FIG. 4, so that the positive electrode connector 41 can be directly connected to the negative electrode connector 42 of another upper energy storage apparatus 1 by being brought into an upward posture (a posture in which the end of the positive electrode connector 41 inserted into the negative electrode connector 41 faces upward, and the insertion and removal direction of the positive electrode connector 41 with respect to the negative electrode connector 42 is in the vertical direction, and the same applies hereinafter). As described above, the positive electrode power cable 31 and the negative electrode power cable 32 are disposed at positions and lengths that can be directed to the opposite sides on the same straight line. Consequently, the plurality of energy storage apparatuses 1 arranged in the row in the vertical direction can be easily connected in series. More specifically, the positive electrode connector 41 and the negative electrode connector 42 can be always arranged in the same straight line. A root portion of the positive electrode connector 41 in the positive electrode power cable 31 and a root portion of the negative electrode connector 42 in the negative electrode power cable 32 can be always arranged in the same straight line. In FIG. 4, the positive electrode power cable 31 and the negative electrode power cable 32 are disposed at positions and lengths that can be directed to opposite sides (the opening of the negative electrode connector 42 faces downward and the tip of the positive electrode connector 41 faces upward) on a straight line L in the vertical direction (Z-axis direction). More specifically, the positive electrode connector 41 and the negative electrode connector 42 can be arranged on the straight line L while facing opposite sides. The root portion of the positive electrode connector 41 in the positive electrode power cable 31 and the root portion of the negative electrode connector 42 in the negative electrode power cable 32 can be arranged in the straight line L. Consequently, the plurality of energy storage apparatuses 1 arranged in the vertical direction can be easily connected in series.

More specifically, both the positive electrode power cable 31 and the negative electrode power cable 32 extended to the outside from the end 18a of the outer case 18 are extended to the outside of the outer case 18 from the corner 19 that is a part of the end 18a. That is, in a nutshell, the positive electrode power cable 31 and the negative electrode power cable 32 are in the state of being drawn out from the outer case 18 within a predetermined range centered on one vertex of the prismatic outer case 18. The range of the corner 19 of the outer case 18 is exemplified as a range surrounded by a dotted line in FIG. 5. The range of the corner 19 in FIG. 5 is described as follows.

Figure 5:
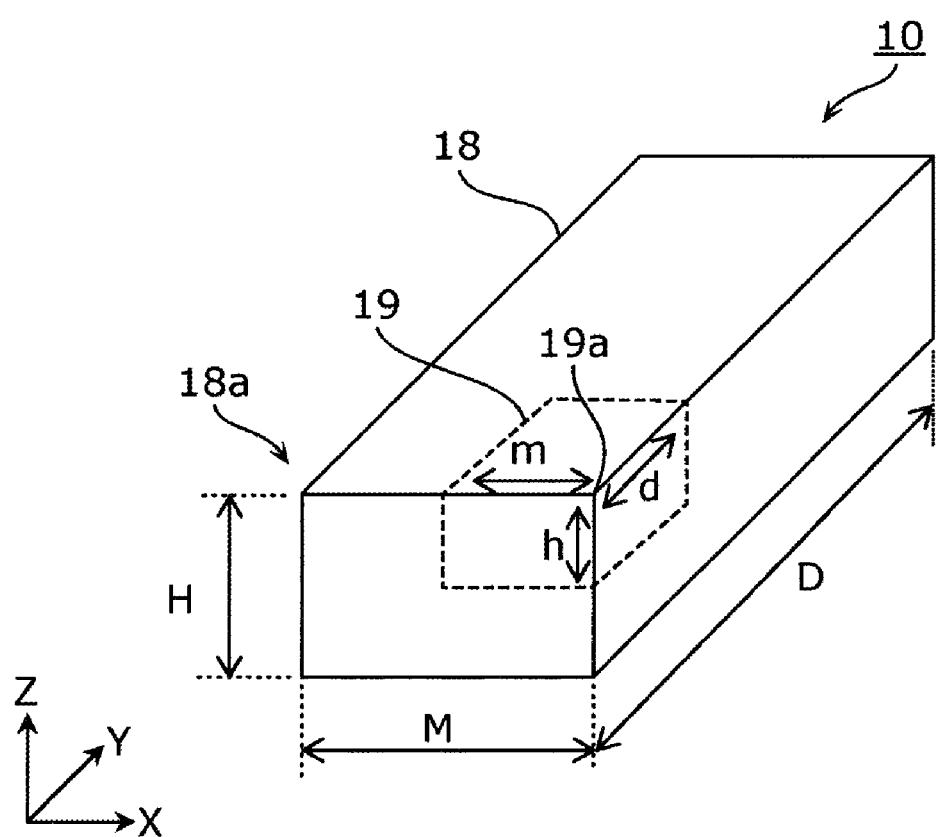
FIG. 5 is a view illustrating an example of a range of a corner in the outer case of the embodiment.

As illustrated in FIG. 5, it is assumed that the outer case 18 that is a rectangular parallelepiped shape as a whole is disposed such that each side of the outer case 18 extends along the X-axis, the Y-axis, or the Z-axis, and it is assumed that lengths of the sides are D, M, and H (in FIG. 5, D>M>H). At this time, a range from one vertex 19a included in the end 18a in the longitudinal direction (Y-axis direction) of the outer case 18 to d in the Y-axis direction, to m in the X-axis direction, and to h in the Z-axis direction (a region inside the dotted line in FIG. 5) is defined as the corner 19. The values of d, m, and h are m=M/2 and h=H/2, and d is one of m and h. That is, d may be the same as m, which is a larger value of m and h (d=M/2), or may be the same as h, which is a smaller value of m and h (d=H/2). The range of the corner 19 described in this manner is an example, and the corner 19 may be a range (within a sphere having a radius h centered on the vertex 19a) in which the linear distance from the vertex 19a falls within h that is a smaller one of m and h, or the like. The range may be d=D/2. To further limit the range of the corner 19, m=M/N, h=H/N, and h=m or h, and N may be an integer greater than 2. In this case, outlets of the positive electrode power cable 31 and the negative electrode power cable 32 from the outer case 18 are concentrated in a range closer to the vertex 19a.

In the embodiment, the outlets of the positive electrode power cable 31 and the negative electrode power cable 32 from the outer case 18, namely, the portions that is disposed while penetrating the inside and the outside of the outer case 18 are located approximately on the upper side of the outer case 18 and within the range from the vertex 19a to the distance m.

As described above, in the embodiment, the outlets of the positive electrode power cable 31 and the negative electrode power cable 32 from the outer case 18 are concentrated at the corner 19.

[3. Configuration of Energy Storage Facility]

As described above, the energy storage apparatus 1 configured as described above can be used as a stationary battery provided in the energy storage facility. Hereinafter, an energy storage facility 100 of the embodiment will be described with reference to FIGS. 6 and 7.

Figure 6:
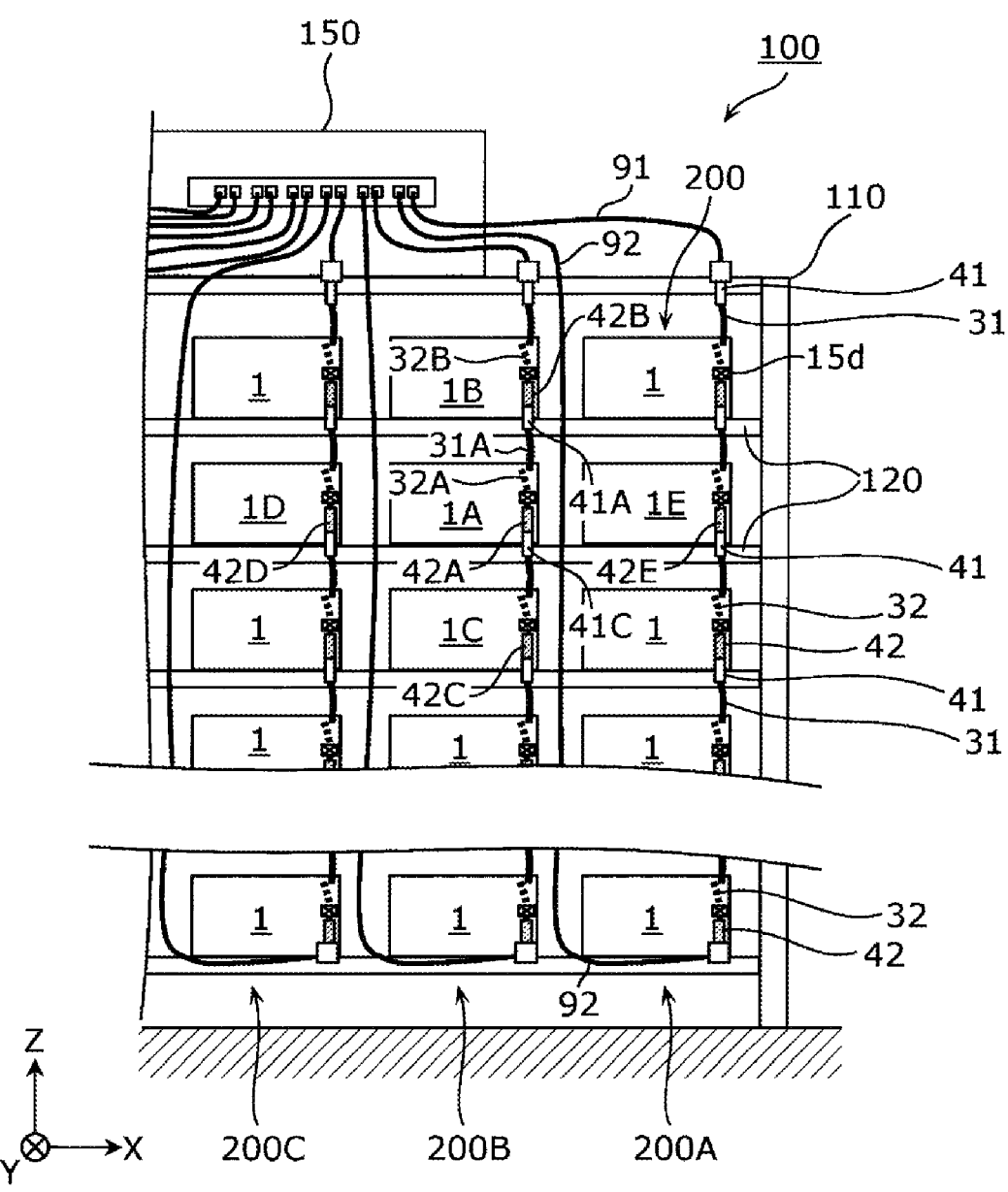
FIG. 6 is a partial front view illustrating a configuration outline of an energy storage facility of the embodiment.
Figure 7:
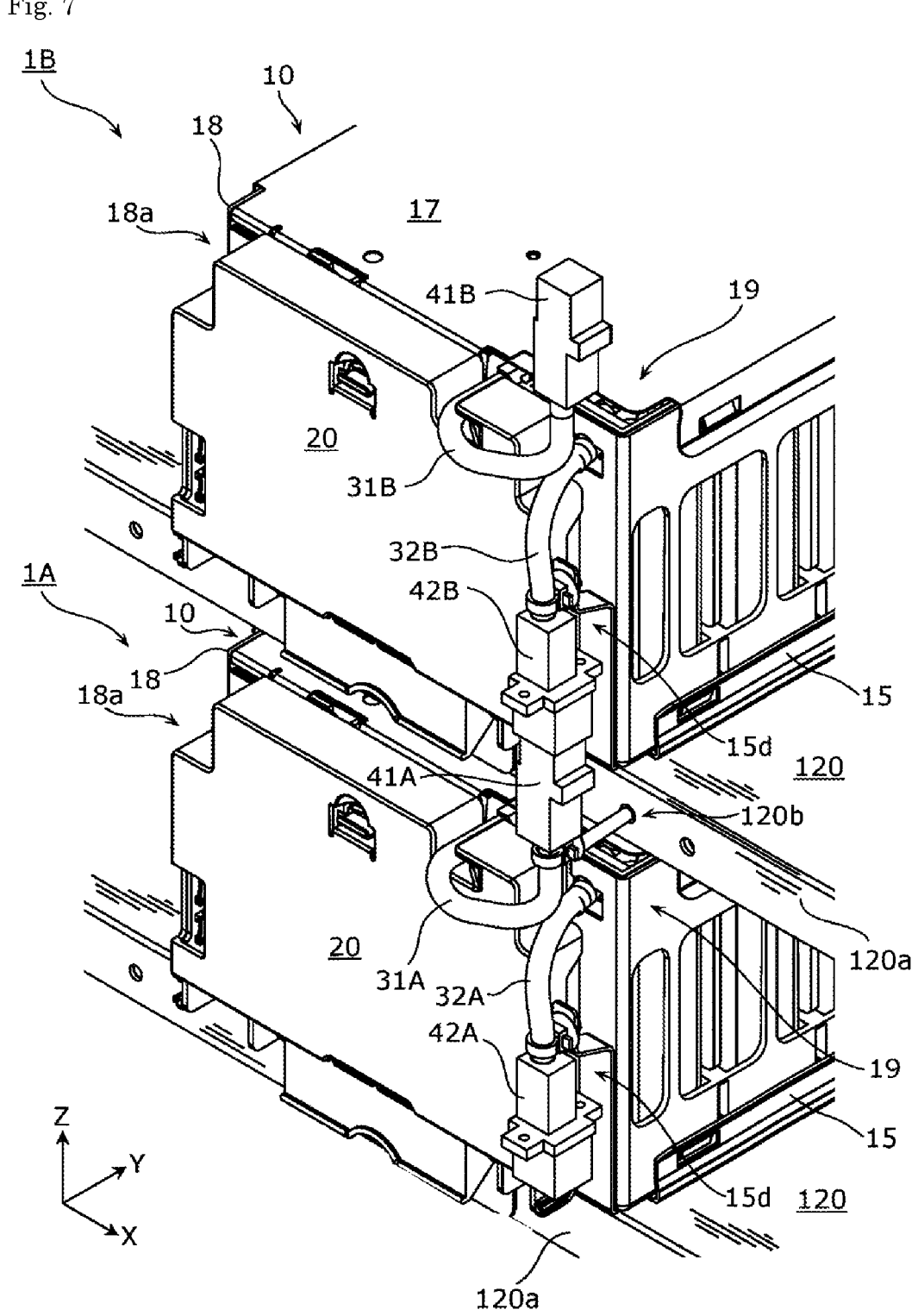
FIG. 7 is an enlarged perspective view illustrating an aspect of electric connection between two energy storage apparatuses in the energy storage facility of the embodiment.

FIG. 6 is a partial front view illustrating a configuration outline of the energy storage facility 100 of the embodiment. In FIG. 6, in each of the plurality of energy storage apparatuses 1, illustration of the substrate unit 20 is omitted, and the fixing unit 15d is simply illustrated, for example, schematically illustrated. The positive electrode power cable 31 is illustrated by a thick solid line, and the negative electrode power cable 32 is illustrated by a thick dotted line. These supplementary items also apply to FIGS. 8 and 9 described later. FIG. 7 is an enlarged perspective view illustrating an aspect of the electric connection between two energy storage apparatuses 1 in the energy storage facility 100 of the embodiment. In FIG. 7, only two vertically-arranged energy storage apparatuses 1 and a shelf board 120 therebetween are focused on, and illustration of the other energy storage apparatuses 1 and the like is omitted.

As illustrated in FIG. 6, the energy storage facility 100 includes the plurality of energy storage apparatuses 1, a rack 110 accommodating the plurality of energy storage apparatuses 1, and an electric circuit unit 150 connected to the plurality of energy storage apparatuses 1. The racks 110 has a plurality of shelf boards 120 on which at least one energy storage apparatus 1 can be mounted. The plurality of shelf boards 120 are arranged in the vertical direction. In the rack 110 configured as described above, the plurality of energy storage apparatuses 1 mounted on the plurality of shelf boards 120 are arranged in the straight line along the vertical direction. That is, in the rack 110, a plurality of rows (energy storage apparatus rows 200) of the energy storage apparatuses 1 in the vertical direction (perpendicular direction) are formed in the horizontal direction. In FIG. 6, different reference numerals (200A, 200B, 200C) are denoted to the plurality of energy storage apparatus rows 200 in order to distinguish the plurality of energy storage apparatus rows 200 arranged in the horizontal direction from each other.

Thus, the energy storage apparatus 1 of the embodiment can be efficiently and easily electrically connected to at least one of the energy storage apparatuses 1 disposed immediately above and immediately below the energy storage apparatus 1. Specifically, focusing on one energy storage apparatus 1, as described above, as illustrated in FIG. 7, the negative electrode connector 42 and the positive electrode connector 41 can be in mutually opposite postures on the straight line in the vertical direction. With such a configuration, as illustrated in FIG. 6, the plurality of energy storage apparatuses 1 can be connected in series in each of the plurality of energy storage apparatuses rows 200. The positive electrode connector 41 of the uppermost energy storage apparatus 1 in each of the plurality of energy storage apparatuses rows 200 is connected to the electric circuit unit 150 by a connection cable 91, and the negative electrode connector 42 of the lowermost energy storage apparatus 1 is connected to the electric circuit unit 150 by a connection cable 92.

The plurality of energy storage apparatus rows 200 are formed in the horizontal direction, and the electric circuit unit 150 electrically connects the energy storage apparatus rows 200 adjacent to each other in the horizontal direction in series. The energy storage apparatus rows 200A, 200B, and 200C are connected in series in this order. Thus, all the energy storage apparatuses 1 accommodated in the rack 110 are electrically connected in series. That is, in the plurality of energy storage apparatuses 1 arranged vertically and horizontally (vertically and horizontally) by being accommodated in the rack 110, the series connection in the perpendicular direction is made by the connection between the positive electrode connector 41 and the negative electrode connector 42 of two energy storage apparatuses 1 adjacent vertically. In the plurality of energy storage apparatuses 1 arranged vertically and horizontally, the series connection of the energy storage apparatus rows 200 in the horizontal direction is performed by the electric circuit unit 150 electrically interposed between the energy storage apparatus rows 200 adjacent to each other in the horizontal direction. The series connection between the energy storage apparatus rows 200 may be made by not the electric circuit unit 150 but an intermediate cable connecting the energy storage apparatus rows 200 adjacent to each other in the horizontal direction.

The energy storage apparatus rows 200 may be connected in parallel instead of connecting all the energy storage apparatus rows 200 in series. Some (at least two) energy storage apparatus rows 200 among the plurality of energy storage apparatus rows 200 may be connected in series to form one unit of energy storage apparatus group, and similarly, the plurality of energy storage apparatus groups may be configured to connect the respective energy storage apparatus groups in parallel.

The electric circuit unit 150 accommodates a wiring cable, a wiring breaker (circuit breaker), a control circuit, and the like in order to connect the energy storage apparatus rows 200 in series. The circuit breaker is disposed on a main circuit through which a main current charging and discharging each energy storage apparatus 1 flows, and the control circuit is connected to the substrate unit 20 of each energy storage apparatus 1 by a signal line (not illustrated). The electric circuit unit 150 can control the charge-discharge of the plurality of energy storage apparatuses 1 for each energy storage apparatus row 200.

In the energy storage facility 100 having such a configuration, when attention is paid to whether one energy storage apparatus 1 can be connected to the four energy storage apparatuses 1 on the upper, lower, left, and right sides thereof, the one energy storage apparatus 1 can be connected only to the upper and lower energy storage apparatuses 1. Specifically, when the energy storage apparatus 1 located at the substantially center in FIG. 6 is denoted as an energy storage apparatus 1A, the four energy storage apparatuses 1 on the upper, lower, left, and right sides thereof are denoted as energy storage apparatuses 1B, 1C, 1D, and 1E, and the power cables and the connectors are also denoted by reference signs A to E for distinction, the description will be made as follows. The energy storage apparatus 1A is an example of the first energy storage apparatus, and the energy storage apparatus 1B is an example of the second energy storage apparatus.

A negative electrode power cable 32A of the energy storage apparatus 1A is fixed by the fixing unit 15*d* (see FIG. 7) included in the energy storage unit 10 of the energy storage apparatus 1A such that a negative electrode connector 42A is directed downward (an opening through which a positive electrode connector 41C is connected is directed downward). The length of a positive electrode power cable 31A of the energy storage apparatus 1A is such a length that a positive electrode connector 41A cannot be connected to the negative electrode connector 42A while the negative electrode power cable 32A is fixed by the fixing unit 15*d*.

In each of the energy storage apparatuses 1B to 1E on the upper, lower, left, and right sides of the energy storage apparatus 1A, negative electrode connectors 42B to 42E are directed downward. In this state, the positive electrode power cable 31A of the energy storage apparatus 1A is not long enough to connect the positive electrode connector 41A to the negative electrode connectors 42C, 42D, and 42E of the immediately below, right, and left energy storage apparatuses 1C, 1D, and 1E. However, the negative electrode connector 42B of the energy storage apparatus 1B immediately above the energy storage apparatus 1A is disposed in a downward posture, namely, while facing the side where the positive electrode connector 41A exists. With such a configuration, as illustrated in FIGS. 6 and 7, the positive electrode connector 41A included in the positive electrode power cable 31A of the energy storage apparatus 1A can be directly connected to the negative electrode connector 42B included in the negative electrode power cable 32B of the energy storage apparatus 1B without any difficulty. In FIG. 6, the four energy storage apparatuses 1 obliquely above and obliquely below the energy storage apparatus 1A are farther from the positive electrode connector 41A as compared with the energy storage apparatuses 1B to 1E on the upper, lower, left, and right sides. Consequently, each of the negative electrode connectors 42 cannot be connected to the positive electrode connector 41A.

As described above, in the embodiment, in the plurality of energy storage apparatuses 1 arranged vertically and horizontally, only the vertically-arranged energy storage apparatuses 1 can be directly connected to each other.

Focusing on the positions in the front-rear direction of the positive electrode connector 41 and the negative electrode connector 42, first, each energy storage apparatus 1 is disposed in a posture where the end 18a of the outer case 18 faces the front side (the Y-axis negative direction side) of the rack 110 as illustrated in FIG. 7. The positions in the front-rear direction of the positive electrode connector 41 and the negative electrode connector 42 are located at or near a front end face 120a of the shelf board 120.

In the example of FIG. 7, the positive electrode connector 41A and the negative electrode connector 42A of the energy storage apparatus 1A are located in front of the front end face 120a of the shelf board 120. Thus, when the positive electrode connector 41A is connected to the negative electrode connector 42B, the shelf board 120 on the energy storage apparatus 1A does not become an obstacle. Similarly, when the positive electrode connector 41C (see FIG. 6) is connected to the negative electrode connector 42A, the shelf board 120 under the energy storage apparatus 1A does not become an obstacle. The positions in the front-rear direction of the plurality of shelf boards 120 arranged in the vertical direction are the same, and the positions in the front-rear direction of the front end faces 120a are also the same.

In the example of FIG. 7, the positive electrode power cable 31 including the positive electrode connector 41 is also fixed such that positive electrode connector 41 takes a predetermined posture. Specifically, a part of the positive electrode power cable 31A of the energy storage apparatus 1A is fixed to the front end face of the shelf board 120. In the embodiment, a through-hole made in the front end face of the shelf board 120 functions as a fixing unit 120b. Fixing by the fixing unit 120b can be implemented using a push mount tie as a fixing member similarly to the fixing unit 15d. In the example of FIG. 7, the push mount tie fixing the positive electrode power cable 31A is inserted into the hole (fixing unit 120b) of the front end face 120a of the shelf board 120 on the energy storage apparatus 1A, whereby the fixing of the positive electrode power cable 31A is implemented. Thus, the positive electrode connector 41A is fixed in a posture facing upward, namely, in a posture facing the negative electrode connector 42B that is a connection partner. As a result, bending stress generated by bending of the positive electrode power cable 31A can be absorbed or defused by the fixing unit 120b and the push mount tie. Thus, even when the positive electrode power cable 31A is relatively hard, the possibility that the bending stress of the positive electrode power cable 31A obstructs the electric and mechanical connection between the positive electrode connector 41A and the negative electrode connector 42B is reduced. Similarly to the fixing unit 15d, the fixing unit 120b is not particularly limited in the fixing structure. At the time of maintenance or the like of the energy storage apparatus 1, the positive electrode connector 41 and the negative electrode connector 42 are required to be removed. For this reason, the size of the through-hole that is the fixing unit 120b is set such that the positive electrode power cable 31 can be detachably fixed.

The fixing unit 120b provided on the front end face of the shelf board 120 can also be used for fixing the connection cable 92 (see FIG. 6). That is, the portion of the connection cable 92 located on the front of the rack 110 can be fixed to the rack 110 by inserting the push mount tie as the fixing member attached to the connection cable 92 into the fixing unit 120b.

4. First Modification

As described above, in the embodiment, in the energy storage apparatus 1, the positive electrode power cable 31 and the negative electrode power cable 32 are disposed at the position and the length at which one of the positive electrode connector 41 and the negative electrode connector 42 can be directed to the opposite side of the other on the straight line in the vertical direction. However, the direction in which the positive electrode connector 41 and the negative electrode connector 42 are arranged is not limited to the vertical direction. For this reason, the case where the direction in which the positive electrode connector 41 and the negative electrode connector 42 are arranged is the horizontal direction will be described as a first modification of the embodiment while focusing on difference from the embodiment.

Figure 8:
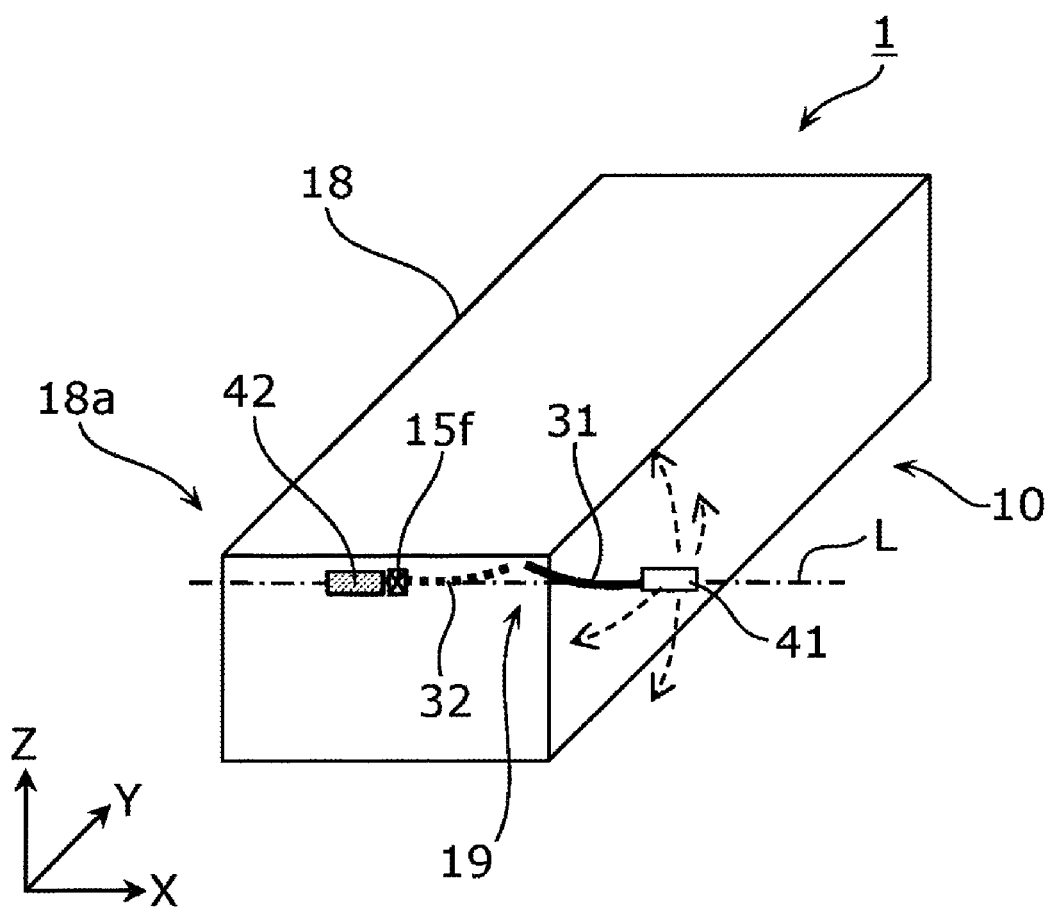
FIG. 8 is a schematic diagram illustrating a displacement example of a positive electrode power cable and a negative electrode power cable of an energy storage apparatus according to a modification of the embodiment.

FIG. 8 is a schematic diagram illustrating a displacement example of the positive electrode power cable 31 and the negative electrode power cable 32 of the energy storage apparatus 1 according to a first modification of the embodiment. FIG. 9 is a partial plan view illustrating a configuration outline of an energy storage facility 100 according to the first modification of the embodiment. In FIG. 9, the three energy storage apparatuses 1 are respectively referred to as energy storage apparatuses 1F, 1G, and 1H in order to distinguish the three energy storage apparatuses 1 from each other. The energy storage apparatus 1F is an example of the first energy storage apparatus, and the energy storage apparatus 1H is an example of the second energy storage apparatus. FIG. 9 illustrates rows of the plurality of energy storage apparatuses 1 arranged in the horizontal direction (energy storage apparatus rows), and different reference numerals (200D, 200E) are denoted to the respective energy storage apparatus rows in order to distinguish two energy storage apparatus rows that are arranged in the vertical direction.

The energy storage apparatus 1 of the first modification has the same basic structure as the energy storage apparatus 1 of the embodiment. That is, the energy storage apparatus 1 of the first modification includes the substrate unit 20 (not illustrated in FIGS. 8 and 9), and a plurality of energy storage devices 11 are accommodated in the inside of the outer case 18. In the inside of the outer case 18, total positive terminals (positive electrode connection terminals 51 of the energy storage units 10) of the plurality of energy storage devices 11 and the positive electrode power cable 31 are connected to each other, and total negative terminals (negative electrode connection terminals 52 of the energy storage units 10) of the plurality of energy storage devices 11 and the negative electrode power cable 32 are connected to each other. Both the positive electrode power cable 31 and the negative electrode power cable 32 extend to the outside from the corner 19 at the end 18a of the outer case 18.

However, as illustrated in FIG. 8, a part of the negative electrode power cable 32 of the first modification is fixed by a fixing unit 15f such that the negative electrode connector 42 is oriented leftward. In this case, the positive electrode power cable 31 is not located and long enough to connect the positive electrode connector 41 to the negative electrode connector 42. That is, because a part of the negative electrode power cable 32 is fixed by the fixing unit 15f, the negative electrode connector 42 and the positive electrode connector 41 are disposed in an unconnectable posture.

However, the positive electrode power cable 31 included in the energy storage apparatus 1 is not fixed, so that the positive electrode connector 41 can be directed in various directions. That is, as illustrated in FIG. 8, the positive electrode power cable 31 and the negative electrode power cable 32 are disposed at the position and the length at which one of the positive electrode connector 41 and the negative electrode connector 42 can be directed to the opposite side of the other on the straight line L in the horizontal direction. When the energy storage apparatus 1 having the above-mentioned configuration is used in the energy storage facility 100 of the first modification illustrated in FIG. 9, the negative electrode connector 42 of one of the two energy storage apparatuses 1 disposed adjacently to each other in the horizontal direction (X-axis direction) can be directly connected to the positive electrode connector 41 of the other energy storage apparatus 1 without any difficulty, and erroneous connection is not generated.

The negative electrode connector 42 of the energy storage apparatus 1F can be connected only to the positive electrode connector 41 of the energy storage apparatus 1G adjacent to the energy storage apparatus 1F on the left when viewed from the front. The positive electrode connector 41 of the energy storage apparatus 1F can be connected only to the negative electrode connector 42 of the energy storage apparatus 1H adjacent to the energy storage apparatus 1F on the right when viewed from the front. Thus, the plurality of energy storage apparatuses 1 arranged in the horizontal direction can be easily or efficiently connected in series. In the energy storage facility 100 of the first modification, the energy storage apparatuses 1 at the left and right ends in the row in the horizontal direction of the energy storage apparatuses 1 are connected to the electric circuit unit 150 (not illustrated) by the connection cable 91 (not illustrated) or the connection cable 92. Thus, the electric circuit unit 150 can control the charge-discharge of the plurality of energy storage apparatuses 1 for each energy storage apparatus row (200D, 200E) arranged in the vertical direction.

5. Second Modification

In the embodiment, in the energy storage apparatus 1, both the positive electrode power cable 31 and the negative electrode power cable 32 extend to the outside from the corner 19 at the end 18a of the outer case 18. However, the positive electrode power cable 31 and the negative electrode power cable 32 may be extended to the outside from different corners 19 of the outer case 18. For this reason, the case where the positive electrode power cable 31 and the negative electrode power cable 32 extend from mutually different corners 19 will be described as a second modification of the embodiment while focusing on difference from the embodiment.

Figure 10:
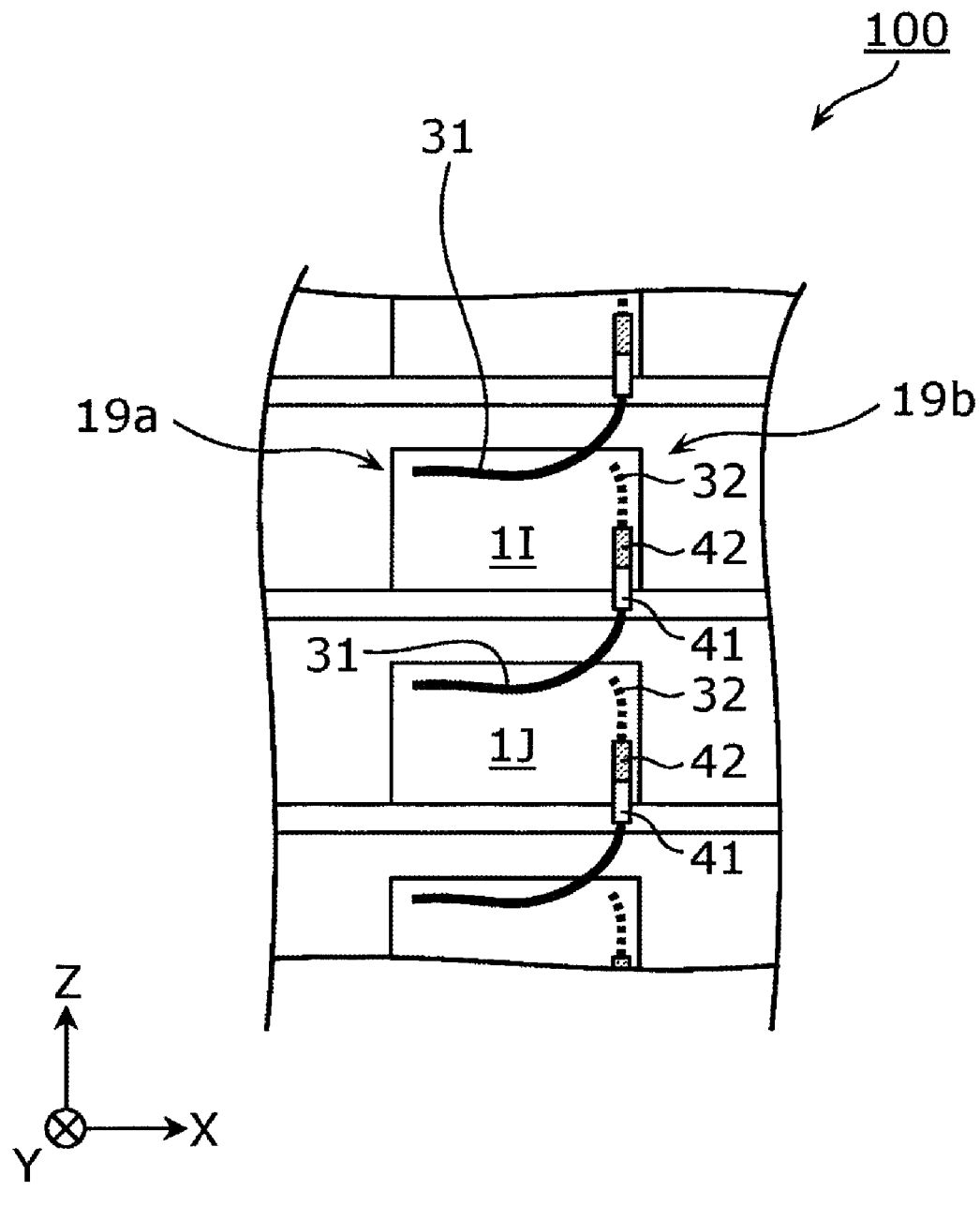
FIG. 10 is a schematic diagram illustrating a disposition example of a positive electrode power cable and a negative electrode power cable of an energy storage apparatus according to a second modification of the embodiment.

FIG. 10 is a schematic diagram illustrating a displacement example of the positive electrode power cable 31 and the negative electrode power cable 32 of the energy storage apparatus 1 according to a second modification of the embodiment. In FIG. 10, the two energy storage apparatuses 1 are referred to as energy storage apparatuses 1I and 1J in order to distinguish the two energy storage apparatuses 1 from each other. The energy storage apparatus 1I is an example of the first energy storage apparatus, and the energy storage apparatus 1J is an example of the second energy storage apparatus. In order to distinguish the two corners 19 at the upper portion of the end 18a of the energy storage apparatus 1 from each other, reference numerals (19a and 19b) different from each other are denoted.

The energy storage apparatus 1 of the second modification has the same basic structure as the energy storage apparatus 1 of the embodiment. That is, the energy storage apparatus 1 of the second modification includes the substrate unit 20 (not illustrated in FIG. 10), and the plurality of energy storage devices 11 are accommodated in the inside of the outer case 18. In the inside of the outer case 18, total positive terminals (positive electrode connection terminals 51 of the energy storage units 10) of the plurality of energy storage devices 11 and the positive electrode power cable 31 are connected to each other, and total negative terminals (negative electrode connection terminals 52 of the energy storage units 10) of the plurality of energy storage devices 11 and the negative electrode power cable 32 are connected to each other. Both the positive electrode power cable 31 and the negative electrode power cable 32 extend to the outside from the end 18a of the outer case 18.

However, in the negative electrode power cable 32 of the second modification, as illustrated in FIG. 10, the positive electrode power cable 31 extends from a corner 19a to the outside, and the negative electrode power cable 32 extends from a corner 19b to the outside. That is, the positive electrode power cable 31 and the negative electrode power cable 32 extend from the corners 19 different from each other. The negative electrode power cable 32 is fixed to the energy storage unit 10 by a fixing unit (not illustrated). Thus, the negative electrode connector 42 and the positive electrode connector 41 are disposed while being unconnectable to each other.

In this case, the positive electrode power cable 31 included in the energy storage apparatus 1 is not fixed, so that the positive electrode connector 41 can be directed in various directions. That is, as illustrated in FIG. 10, the positive electrode power cable 31 and the negative electrode power cable 32 that are included in one energy storage apparatus 1 are disposed at positions where one of the positive electrode connector 41 and the negative electrode connector 42 can be directed to the opposite side of the other on the straight line in the vertical direction. When the energy storage apparatus 1 having the above-mentioned configuration is used in the energy storage facility 100 of the second modification in FIG. 10, one negative electrode connector 42 of two energy storage apparatuses 1 disposed adjacently to each other in the vertical direction (Z-axis direction) can be directly connected to the other positive electrode connector 41 without any difficulty.

6. Description of Effects

The energy storage facility 100 of the embodiment (including the modification thereof) includes a plurality of energy storage apparatuses 1. Each of the plurality of energy storage apparatuses 1 includes the energy storage unit 10 including the plurality of energy storage devices 11 and the outer case 18 holding the plurality of energy storage devices 11, the positive electrode power cable 31, and the negative electrode power cable 32. The positive electrode power cable 31 is connected to the positive electrode connection terminal 51 of the energy storage unit 10 inside the outer case 18, and extends from the end 18a of the outer case 18 toward the outside of the outer case 18. The negative electrode power cable 32 is connected to the negative electrode connection terminal 52 of the energy storage unit 10 inside the outer case 18, and extends from the end 18a of the outer case 18 toward the outside of the outer case 18. The positive electrode power cable 31 includes the positive electrode connector 41, and the negative electrode power cable 32 includes the negative electrode connector 42 separated from positive electrode connector 41. The positive electrode connector 41 of one energy storage apparatus 1 of two energy storage apparatuses 1 adjacent to each other in the plurality of energy storage apparatuses 1 is directly connected to the negative electrode connector 42 of the other energy storage apparatus 1 of the two energy storage apparatuses 1.

As described above, in the embodiment, in the plurality of arranged energy storage apparatuses 1, one positive electrode connector 41 and the other negative electrode connector 42 of two adjacent energy storage apparatuses 1 are connected to each other, whereby the two energy storage apparatuses 1 are connected to each other. That is, the two energy storage apparatuses 1 are electrically connected by one (one place) connection work. Because the positive electrode connector 41 and the negative electrode connector 42 are separated from each other, the positive electrode connector 41 and the negative electrode connector 42 can be directed in different directions from each other, so that the energy storage apparatus 1 can be connected in series to the energy storage apparatuses 1 on both sides (up and down, left and right, or the like) in the arrangement direction of the energy storage apparatuses 1. As described above, because each energy storage apparatus 1 has the power cables (31 and 32) with the connectors for the positive electrode and the negative electrode, the two energy storage apparatuses 1 to be connected can be easily connected to each other without separately using a conductive member such as a cable for connecting the energy storage apparatuses 1 to each other and without using a tool such as a wrench. As described above, according to the energy storage facility 100 of the embodiment, the connection work of the plurality of energy storage apparatuses 1 can be easily performed.

The connection work (such as fastening of a nut) of the positive electrode power cable 31 and the negative electrode power cable 32 to the energy storage unit 10 is performed in the process of manufacturing the plurality of energy storage apparatuses 1. Consequently, reliability or quality of the connection between the positive electrode power cable 31 and the negative electrode power cable 32 and the energy storage unit 10 can be improved, and the reliability or the quality can be made uniform in the plurality of energy storage apparatuses 1.

The plurality of energy storage apparatuses 1 are arranged in at least one direction of the vertical direction and the horizontal direction in the posture in which the ends 18a of the outer cases 18 of the plurality of energy storage apparatuses 1 are directed in the same direction (first direction). In the embodiment, as illustrated in FIGS. 6, 7 and 9, the plurality of energy storage apparatuses 1 are arranged in the vertical direction and the horizontal direction in the posture where the ends 18a of the outer cases 18 face the front surface (the front side of the rack 110). In the positive electrode power cable 31A of one energy storage apparatus 1 (the energy storage apparatus 1A in FIGS. 6 and 7), the positive electrode connector 41A can be connected to the negative electrode connector 42B of the energy storage apparatus 1B, and cannot be connected to the negative electrode connector 42 of each of at least one energy storage apparatus 1 other than the energy storage apparatus 1B (including the energy storage apparatus 1A). In the embodiment, the direction in which the rack 110 faces (direction in which the front end face 120a of shelf board 120 faces, and the Y-axis negative direction) is the first direction. The plurality of energy storage apparatuses 1 are arranged in the vertical direction (Z-axis direction) that is the second direction intersecting the first direction. The second direction intersecting the first direction may be the horizontal direction (X-axis direction). In this case, the plurality of energy storage apparatuses 1 are disposed in the horizontal direction (X-axis direction).

According to this configuration, the positive electrode connector 41 provided in the positive electrode power cable 31 of one energy storage apparatus 1 cannot be physically connected to the negative electrode connector 42 that is prohibited from being connected. Consequently, when a large number of energy storage apparatuses 1 that are the same product are arranged vertically and horizontally, the positive electrode connector 41 and the negative electrode connector 42 are not connected to each other by an incorrect combination, and the positive electrode connector 41 and the negative electrode connector 42 of one energy storage apparatus 1 are not connected to each other (short circuit in the energy storage apparatus 1). That is, the connection work of the plurality of energy storage apparatuses 1 can be easily and accurately performed. The connectable connector and the unconnectable connector of the positive electrode connector 41A can be selectively changed by changing the length of the positive electrode power cable 31A.

The outer case 18 of the energy storage apparatus 1 is a prismatic type, and the positive electrode power cable 31 and the negative electrode power cable 32 are extended to the outside of the outer case 18 from the corner 19 of the outer case 18 that is a part of the end 18a of the outer case 18.

As described above, in the energy storage apparatus 1, the outlets of the two power cables (31 and 32) for the positive electrode and the negative electrode from the outer case 18 are gathered at the corner 19 of the outer case 18. Consequently, even when the energy storage apparatus 1 of the connection partner is any of the upper, lower, left, and right, the positive electrode power cable 31 and the negative electrode power cable 32 are arranged in the posture along the vertical direction or the horizontal direction (see FIGS. 6 and 9). That is, when the adjacent energy storage apparatuses 1 are connected in series, the positive electrode power cable 31 and the negative electrode power cable 32 are not disposed obliquely with respect to the vertical direction or the horizontal direction. Accordingly, the lengths of the positive electrode power cable 31 and the negative electrode power cable 32 may be relatively short, and the wire connection work between the positive electrode power cable 31 and the negative electrode power cable 32 (the connection work between the positive electrode connector 41 and the negative electrode connector 42) is easy.

In each of the plurality of energy storage apparatuses 1, one of the positive electrode connector 41 and the negative electrode connector 42 of the positive electrode power cable 31 and the negative electrode power cable 32 is disposed on the same straight line at the position where the insertion direction of the connector can be directed to the opposite side of the other of the positive electrode connector 41 and the negative electrode connector 42.

According to this configuration, the positive electrode connector 41 and the negative electrode connector 42 of one energy storage apparatus 1 are arranged in opposite directions and on the straight line. Consequently, when the plurality of energy storage apparatuses 1 are arranged in the direction parallel to the straight line, the positive electrode connector 41 of one energy storage apparatus 1 (first energy storage apparatus) and the negative electrode connector 42 of the other energy storage apparatus 1 (second energy storage apparatus) of two adjacent energy storage apparatuses 1 become the posture coaxially facing each other. Accordingly, the plurality of energy storage apparatuses 1 can be easily connected in series. That is, in the embodiment, the positive electrode connector 41 and the negative electrode connector 42 of one energy storage apparatus 1 are inserted in opposite directions, and arranged on the straight line L in the vertical direction (see FIG. 4). Consequently, as illustrated in FIG. 6, the plurality of energy storage apparatuses 1 arrayed regularly in the vertical direction can be easily connected in series. In the modification, the positive electrode connector 41 and the negative electrode connector 42 of one energy storage apparatus 1 are arranged on the straight line L in the horizontal direction in which the insertion directions of the positive electrode connector 41 and the negative electrode connector 42 are opposite to each other (see FIG. 7). Consequently, as illustrated in FIG. 9, the plurality of energy storage apparatuses 1 regularly arrayed in the horizontal direction can be easily connected in series. Whether one of the positive electrode connector 41 and the negative electrode connector 42 can be oriented on the same straight line to the side opposite to the other may be related to not only the positions of the positive electrode power cable 31 and the negative electrode power cable 32 but also the lengths of the positive electrode power cable 31 and the negative electrode power cable 32. That is, in the positive electrode power cable 31 and the negative electrode power cable 32, one of the positive electrode connector 41 and the negative electrode connector 42 may be disposed at the position and the length at which one of the positive electrode connector 41 and the negative electrode connector 42 can be directed to the side opposite to the other on the same straight line.

The energy storage facility 100 includes the rack 110 including at least one shelf board 120 on which each of the plurality of energy storage apparatuses 1 is mounted. Each of the plurality of energy storage apparatuses 1 is disposed such that the end 18a of the outer case 18 faces the front of the rack 110. The positive electrode connector 41 and the negative electrode connector 42 are disposed such that the positions in the front-rear direction of the positive electrode connector 41 and the negative electrode connector 42 are located at or near the front end face 120a of the shelf board 120.

According to this configuration, the positive electrode connector 41 and the negative electrode connector 42 of the combination to be connected are disposed at or near the front end of the rack 110. Consequently, the work of connecting the positive electrode connector 41 and the negative electrode connector 42 of one of the two energy storage apparatuses 1 vertically adjacent to each other is easily performed after the plurality of energy storage apparatuses 1 are mounted on the plurality of shelf boards 120 of the rack 110. More preferably, the positions in the front-rear direction of the positive electrode connector 41 and the negative electrode connector 42 are the same as or in front of the front end face 120a of the shelf board 120 located between the two energy storage apparatuses 1. In this case, as illustrated in FIG. 7, the positive electrode power cable 31 including the positive electrode connector 41 is disposed at the position exceeding the shelf board 120 in the vertical direction, and disposed at the position not substantially interfering the shelf board 120. The negative electrode connector 42 is located immediately above the positive electrode connector 41 facing upward. Accordingly, the possibility that the connection work between the positive electrode connector 41 and the negative electrode connector 42 is inhibited by the shelf board 120 can be substantially eliminated.

In the energy storage facility 100, at least a part of the negative electrode power cable 32 extending from the energy storage unit 10 is fixed to the energy storage unit 10, and a part of the positive electrode power cable 31 extending from the energy storage unit 10 is not fixed to the energy storage unit 10.

As described above, the negative electrode power cable 32 drawn out from one energy storage apparatus 1 is fixed to the one energy storage apparatus 1, and the positive electrode power cable 31 drawn out from the one energy storage apparatus 1 is not fixed and is free. Thus, when the positive electrode connector 41 and the negative electrode connector 42 are connected as illustrated in FIG. 6, the position of the negative electrode connector 42 is stabilized, and a freedom degree of the position and posture of the positive electrode connector 41 is high, so that the connection work between the negative electrode connector 42 and the positive electrode connector 41 is easy to perform. The position of the set of the negative electrode connector 42 and the positive electrode connector 41 in the connected state can be regulated to a predetermined position. For this reason, it is easy to visually confirm the connection state of each of the plurality of sets of the negative electrode connector 42 and the positive electrode connector 41.

The energy storage apparatus 1 of the embodiment (including the modifications thereof) includes the energy storage unit 10 including the plurality of energy storage devices 11, the negative electrode power cable 32, and the positive electrode power cable 31. The negative electrode power cable 32 is connected to the negative electrode connection terminal 52 of the energy storage unit 10, and extends outward from the end 18a of the energy storage unit 10. The positive electrode power cable 31 is connected to the positive electrode connection terminal 51 of the energy storage unit 10, and extends outward from the end 18a of the energy storage unit 10. The negative electrode power cable 32 includes the negative electrode connector 42. The positive electrode power cable 31 includes the positive electrode connector 41 having the structure that can be directly connected to the negative electrode connector 42. The negative electrode power cable 32 is disposed in the posture in which the negative electrode connector 42 and the positive electrode connector 41 cannot be connected.

As described above, in the energy storage apparatus 1 of the embodiment, because the negative electrode connector 42 has the structure that can be directly connected to the positive electrode connector 41, the energy storage facility 100 having the large output voltage as a whole can be configured by arranging the plurality of the energy storage apparatuses 1. Because the negative electrode connector 42 and the positive electrode connector 41 included in one energy storage apparatus 1 are provided in a physically unconnectable state, a short circuit due to erroneous connection between the negative electrode connector 42 and the positive electrode connector 41 included in one energy storage apparatus 1 is not generated. As described above, the energy storage apparatus 1 of the embodiment is the energy storage apparatus in which the safety is improved. As for another method, the negative electrode connector 42 and the positive electrode connector 41 can be made unconnectable by adjusting the length of the negative electrode power cable 32 instead of the posture of the negative electrode power cable 32. Both the posture and the length of the negative electrode power cable 32 may be adjusted in order to make the negative electrode connector 42 and the positive electrode connector 41 unconnectable.

At least a part of a portion of the negative electrode power cable 32 extending from the energy storage unit 10 is fixed to the energy storage unit 10, so that the negative electrode connector 42 and the positive electrode connector 41 are disposed in the posture where the negative electrode connector 42 and the positive electrode connector 41 cannot be connected to each other.

According to this configuration, the negative electrode connector 42 in the negative electrode power cable 32 is fixed. Alternatively, a cable portion of the negative electrode power cable 32 near the negative electrode connector 42 is fixed. Consequently, the erroneous connection between the negative electrode connector 42 and the positive electrode connector 41 of the energy storage apparatus 1 can be prevented, and the negative electrode power cable 32 can be fixed in the direction suitable for connection to another energy storage apparatus 1.

More specifically, in the embodiment, as illustrated in FIGS. 1, 4, and the like, the negative electrode power cable 32 extending from the end 18*a* of the energy storage unit 10 is fixed at the position on the inside (the side of the energy storage unit 10) with respect to the end surface in the extending direction (Y-axis negative direction) of the substrate unit 20 disposed at the end 18*a*. That is, the position where the negative electrode power cable 32 is drawn out from the energy storage unit 10 is the end 18*a* of the energy storage unit 10 and a lateral of the substrate unit 20, so that the negative electrode power cable 32 can be bent and disposed so as not to protrude from the outer shape of the energy storage apparatus 1. Thus, the energy storage apparatus 1 can be made compact.

The energy storage unit 10 includes the plate-like base member 15 that supports the plurality of energy storage devices 11. The base member 15 includes the fixing unit 15*d* that fixes at least a part of the negative electrode power cable 32.

As described above, since the fixing unit 15*d* is provided on the base member 15 made of metal such as iron, the negative electrode power cable 32 can be firmly or reliably fixed. As a result, the negative electrode connector 42 is more reliably maintained at a predetermined posture. Accordingly, reliability or certainty of the connection of the negative electrode connector 42 to another connector (the positive electrode connector 41 or the like) is improved.

The negative electrode connector 42 is disposed in the posture in the opposite direction to the direction of the positive electrode connector 41 when the positive electrode connector 41 is connected to the negative electrode connector 42 of another energy storage apparatus 1.

Thus, one energy storage apparatus 1 (first energy storage apparatus) and two other energy storage apparatuses 1 (second energy storage apparatus and third energy storage apparatus) that sandwich the one energy storage apparatus 1 therebetween can be arranged in a row, and these energy storage apparatuses 1 can be electrically connected in series to each other. Specifically, in the embodiment, as illustrated in FIG. 6, in the energy storage apparatus 1A (first energy storage apparatus), the positive electrode connector 41A is connected to the negative electrode connector 42B of the upper energy storage apparatus 1B (second energy storage apparatus), and the negative electrode connector 42A is disposed in the downward posture. The negative electrode connector 42A is connected to the positive electrode connector 41C of the lower energy storage apparatus 1C (third energy storage apparatus). In this state, the insertion direction (downward direction) of the negative electrode connector 42A of the energy storage apparatus 1A into the positive electrode connector 41C of the energy storage apparatus 1C is opposite to the insertion direction (upward direction) of the positive electrode connector 41A of the energy storage apparatus 1A into the negative electrode connector 42B of the energy storage apparatus 1B. Thus, each of the plurality of energy storage apparatuses 1 arranged in a row in the vertical direction is safely and easily connected to the energy storage apparatus 1 to be connected. In the modification, as illustrated in FIG. 9, the positive electrode connector 41 of the energy storage apparatus 1F (first energy storage apparatus) is connected to the negative electrode connector 42 of the right energy storage apparatus 1H (second energy storage apparatus), and the negative electrode connector 42 of the energy storage apparatus 1F is disposed in the leftward posture. The negative electrode connector 42A of the energy storage apparatus 1F is connected to the positive electrode connector 41 of the left energy storage apparatus 1G (third energy storage apparatus). In this state, the insertion direction (left direction) of the negative electrode connector 42 of the energy storage apparatus 1F into the positive electrode connector 41 of the energy storage apparatus 1G is opposite to the insertion direction (right direction) of the positive electrode connector 41 of the energy storage apparatus 1F into the negative electrode connector 42 of the energy storage apparatus 1H. With such a configuration, each of the plurality of energy storage apparatuses 1 arranged in the row in the horizontal direction is safely and easily connected to the energy storage apparatus 1 to be connected.

As illustrated in FIG. 2, the energy storage apparatus 1 includes the substrate unit 20 including the substrate 25 electrically connected to the energy storage unit 10. The substrate unit 20 is disposed at the end 18*a* of the energy storage unit 10.

As described above, the substrate unit 20 is disposed at the end 18*a* of the energy storage unit 10 from which the negative electrode power cable 32 and the positive electrode power cable 31 are drawn out. Consequently, the maintenance of the substrate unit 20 or the substrate 25 or the connection work between the negative electrode connector 42 and the positive electrode connector 41 can be facilitated by disposing the energy storage apparatus 1 in which the end 18*a* of the energy storage unit 10 faces a passage side where the worker moves back and forth.

Other Embodiments

Although the energy storage facility 100 and the energy storage apparatus 1 of the embodiment and the modifications are described above, the present invention is not limited to the above embodiment and modifications. That is, the embodiment and modifications disclosed herein are illustrative in all respects and are not restrictive, and the scope of the present invention includes all changes within the meaning and scope equivalent to the claims.

In the embodiment, in each energy storage apparatus 1, the negative electrode connector 42 is fixed in the downward posture in order to connect the plurality of energy storage apparatuses 1 arranged in the vertical direction in series. However, the negative electrode connector 42 may be fixed upward. A part of the positive electrode power cable 31 may be fixed such that the positive electrode connector 41 is in the downward or upward posture instead of the negative electrode connector 42. In any case, it is sufficient that one of the negative electrode connector 42 and the positive electrode connector 41 that is not fixed can be connected to one of the negative electrode connector 42 and the positive electrode connector 41 that is fixed in the upper or lower energy storage apparatus 1. Thus, the plurality of energy storage apparatuses 1 can be efficiently connected in series without any difficulty. The same applies to the first modification, and in each energy storage apparatus 1, the negative electrode connector 42 may be fixed not leftward but rightward. Apart of the positive electrode power cable 31 may be fixed such that the positive electrode connector 41 is in the leftward or rightward posture instead of the negative electrode connector 42. In any case, one of the negative electrode connector 42 and the positive electrode connector 41 that is not fixed may be connected to one of the negative electrode connector 42 and the positive electrode connector 41 that is fixed in the left or right energy storage apparatus 1.

It is not always required that one of the negative electrode connector 42 and the positive electrode connector 41 of the energy storage apparatus 1 is fixed. The negative electrode connector 42 and the positive electrode connector 41 of one energy storage apparatus 1 may be unconnectable to each other due to the length or hardness of each of the negative electrode power cable 32 and the positive electrode power cable 31 of the energy storage apparatus 1 or due to the size or shape of each of the negative electrode connector 42 and the positive electrode connector 41. Even in this case, as long as the negative electrode connector 42 and the positive electrode connector 41 can be connected to other energy storage apparatuses 1 adjacent to one energy storage apparatus 1 in the vertical direction or the horizontal direction, the plurality of energy storage apparatuses 1 arranged in the vertical direction or the horizontal direction can be connected in series, and the possibility of the erroneous connection is also reduced.

When the energy storage apparatuses 1 are arrayed in the direction inclined with respect to the vertical direction, in the energy storage apparatus 1, a part of the negative electrode power cable 32 or the positive electrode power cable 31 may be fixed such that the negative electrode connector 42 or the positive electrode connector 41 is oriented along the direction. Thus, the plurality of energy storage apparatuses 1 arrayed in the direction inclined with respect to the vertical direction can be efficiently connected in series without any difficulty.

As illustrated in FIGS. 7 and 8, the corner 19 where the outlets from the outer case 18 of the positive electrode power cable 31 and the negative electrode power cable 32 are aggregated does not need to be the upper right corner when the energy storage apparatus 1 is viewed from the front. The outlets from the outer case 18 of the positive electrode power cable 31 and the negative electrode power cable 32 may be concentrated at upper left, lower left, or lower right corners of the outer case 18 according to the posture of the energy storage device 11 included in the energy storage unit 10, the position of the electrode terminal of the energy storage device 11, or the like.

The energy storage apparatus 1 may not include the substrate unit 20. That is, functions such as monitoring of the state of charge of the plurality of energy storage devices 11 and voltage adjustment may be performed by an external device electrically connected to the energy storage apparatus 1.

The positive electrode power cable 31 and the negative electrode power cable 32 may not extend from the same end of the outer case 18, but may extend toward the outside of the outer case 18 from the end positioned on the opposite side of the outer case 18. In FIG. 2, the positive electrode power cable 31 may extend from the end in the Y-axis negative direction of the outer case 18, and the negative electrode power cable 32 may extend from the end in the Y-axis positive direction of the outer case 18. Even in this case, when the energy storage apparatus 1 can be accessed from the front side and the back side of the rack 110, the connection work between the positive electrode connector 41 and the negative electrode connector 42 can be performed from the front side and the back side of the rack 110. When the plurality of energy storage apparatuses 1 are arranged in a predetermined planar region instead of being accommodated in the rack 110, the connection work or the like between the positive electrode connector 41 and the negative electrode connector 42 can be performed from the upper surface side of the plurality of energy storage apparatuses 1.

In one energy storage apparatus 1, the positive electrode power cable 31 and the negative electrode power cable 32 may be configured such that the negative electrode connector 42 and the positive electrode connector 41 can be connected to each other. Even in this case, the positive electrode power cable 31 of one energy storage apparatus 1 and the negative electrode power cable 32 of the adjacent energy storage apparatus 1 can be electrically connected to each other by direct connector connection. Accordingly, the plurality of energy storage apparatuses 1 arranged in a predetermined direction such as the vertical direction, the horizontal direction, or the front-rear direction can be easily connected in series without separately using a connecting cable and without using a connection work tool. The length of the positive electrode power cable 31 or the negative electrode power cable 32 is not required to be set to such a length that the negative electrode connector 42 and the positive electrode connector 41 cannot be directly connected to each other, so that the length of these cables can be made to have a margin (relatively long). Thus, the freedom degree of the disposition position of the positive electrode power cable 31 or the negative electrode power cable 32 is enhanced when two adjacently-disposed energy storage apparatuses 1 are connected to each other, whereby the connection work between the negative electrode connector 42 and the positive electrode connector 41 is easy to perform. The possibility of the erroneous connection (short circuit) between the negative electrode connector 42 and the positive electrode connector 41 can be reduced by attaching a connector cover to at least one of the negative electrode connector 42 and the positive electrode connector 41 before being connected to another energy storage apparatus 1.

INDUSTRIAL APPLICABILITY

The present invention can be applied to the energy storage apparatus including the energy storage device such as a lithium ion secondary battery and the energy storage facility including the plurality of energy storage apparatuses.

DESCRIPTION OF REFERENCE SIGNS

1, 1A to 1J: energy storage apparatus
10: energy storage unit
11: energy storage device
11*a*: case
11*b*: positive electrode terminal
11*c*: negative electrode terminal
12: spacer
13: bus bar
13*a*: detection cable
13*b*: connector
14: outer case body
15: base member
15*a*: bottom
15*b*, 15*c*, 17*b*, 17*c*: connection unit
15*d*, 15*f*, 120*b*: fixing unit
15*g*: fixing member
15*h*: fixing piece
15*i*: fixing hole
16: substrate unit attaching unit
17: outer case lid
17*a*: top surface

18: outer case
18*a*: end
19, 19*a*, 19*b*: corner
19*a*: vertex
20: substrate unit
21: substrate case
25: substrate
31, 31A: positive electrode power cable
32, 32A, 32B: negative electrode power cable
41, 41A, 41C: positive electrode connector
42, 42A to 42E: negative electrode connector
51: positive electrode connection terminal
52: negative electrode connection terminal
60: bus bar frame
91, 92: connection cable
100: energy storage facility
110: rack
120: shelf board
120*a*: front end face
150: electric circuit unit
200, 200A to 200E: energy storage apparatus row
The invention claimed is:

1. An energy storage facility comprising a plurality of energy storage apparatuses,
wherein each of the plurality of energy storage apparatuses includes:
an energy storage unit including a plurality of energy storage devices and an outer case holding the plurality of energy storage devices;
a first power cable that is connected to one of a positive electrode connection terminal and a negative electrode connection terminal of the energy storage unit inside the outer case and extends from an end of the outer case toward an outside of the outer case; and
a second power cable that is connected to an other of the positive electrode connection terminal and the negative electrode connection terminal of the energy storage unit inside the outer case and extends from the end of the outer case toward the outside of the outer case,
the first power cable includes a first connector,
the second power cable includes a second connector, and
the second connector has a structure that is mechanically connected directly to the first connector,
wherein a first connector of a first energy storage apparatus that is one of two energy storage apparatuses adjacent to each other in the plurality of energy storage apparatuses is mechanically and electrically connected directly to a second connector of a second energy storage apparatus that is an other of the two energy storage apparatuses.

2. The energy storage facility according to claim 1, wherein
the plurality of energy storage apparatuses are arranged in a second direction intersecting a first direction in a posture where the end of the outer case of each of the plurality of energy storage apparatuses face the first direction, and
the first connector of the first energy storage apparatus is configured to be unconnectable to the second connector of an energy storage apparatus other than the second energy storage apparatus.

3. The energy storage facility according to claim 1, wherein
the outer case is prismatic, and
the first power cable and the second power cable extend to the outside of the outer case from a corner of the outer case that is a part of the end of the outer case.

4. The energy storage facility according to claim 1, wherein
in each of the plurality of energy storage apparatuses,
the first power cable and the second power cable are disposed at positions where one of the first connector and the second connector can be oriented toward an opposite side of the other of the first connector and the second connector on the same straight line.

5. An energy storage facility comprising a plurality of energy storage apparatuses,
wherein each of the plurality of energy storage apparatuses includes:
an energy storage unit including a plurality of energy storage devices and an outer case holding the plurality of energy storage devices;
a first power cable that is connected to one of a positive electrode connection terminal and a negative electrode connection terminal of the energy storage unit inside the outer case and extends from an end of the outer case toward an outside of the outer case; and
a second power cable that is connected to an other of the positive electrode connection terminal and the negative electrode connection terminal of the energy storage unit inside the outer case and extends from the end of the outer case toward the outside of the outer case,
the first power cable includes a first connector,
the second power cable includes a second connector, and
the second connector has a structure that can be mechanically connected to the first connector,
wherein a first connector of a first energy storage apparatus that is one of two energy storage apparatuses adjacent to each other in the plurality of energy storage apparatuses is mechanically and electrically connected to a second connector of a second energy storage apparatus that is an other of the two energy storage apparatuses,
further comprising a rack including at least one shelf board on which each of the plurality of energy storage apparatuses is mounted,
wherein in each of the plurality of energy storage apparatuses,
the end of the outer case is disposed so as to face a front of the rack, and the first connector and the second connector are disposed such that positions in a front-rear direction of the first connector and the second connector are located at or near a front end face of the shelf board.

6. The energy storage facility according to claim 1, wherein
at least a part of a portion of the first power cable extending from the energy storage unit is fixed to the energy storage unit, and
a portion of the second power cable extending from the energy storage unit is not fixed to the energy storage unit.

7. An energy storage facility comprising a plurality of energy storage apparatuses and a rack including at least one shelf board on which each of the plurality of energy storage apparatuses is mounted,
wherein each of the plurality of energy storage apparatuses includes:
an energy storage unit including a plurality of energy storage devices and an outer case holding the plurality of energy storage devices;
a first power cable that is connected to one of a positive electrode connection terminal and a negative electrode connection terminal of the energy storage unit inside the outer case and extends from an end of the outer case toward an outside of the outer case; and a second power cable that is connected to an other of the positive electrode connection terminal and the negative electrode connection terminal of the energy storage unit inside the outer case and extends from the end of the outer case toward the outside of the outer case, the first power cable includes a first connector, the second power cable includes a second connector, and the end of the outer case is disposed so as to face a front of the rack, and the first connector and the second connector are disposed such that positions in a front-rear direction of the first connector and the second connector are located at or near a front end face of the shelf board, wherein a first connector of a first energy storage apparatus that is one of two energy storage apparatuses adjacent to each other in the plurality of energy storage apparatuses is mechanically and electrically connected to a second connector of a second energy storage apparatus that is an other of the two energy storage apparatuses.

8. The energy storage facility according to claim 7, wherein the plurality of energy storage apparatuses are arranged in a second direction intersecting a first direction in a posture where the end of the outer case of each of the plurality of energy storage apparatuses face the first direction, and the first connector of the first energy storage apparatus is configured to be unconnectable to the second connector of an energy storage apparatus other than the second energy storage apparatus.

9. The energy storage facility according to claim 7, wherein the outer case is prismatic, and the first power cable and the second power cable extend to the outside of the outer case from a corner of the outer case that is a part of the end of the outer case.

10. The energy storage facility according to claim 7, wherein in each of the plurality of energy storage apparatuses, the first power cable and the second power cable are disposed at positions where one of the first connector and the second connector can be oriented toward an opposite side of the other of the first connector and the second connector on the same straight line.

11. The energy storage facility according to claim 7, wherein at least a part of a portion of the first power cable extending from the energy storage unit is fixed to the energy storage unit, and a portion of the second power cable extending from the energy storage unit is not fixed to the energy storage unit.

12. The energy storage facility according to claim 7, further comprising an electric circuit unit, and a connection cable, wherein the plurality of energy storage apparatuses is arranged in a row to form an energy storage apparatus row, and wherein the connection cable connects an energy storage apparatus at an end of the row to the electric circuit unit.

* * * * *